US010255253B2

(12) United States Patent
Akselrod et al.

(10) Patent No.: US 10,255,253 B2
(45) Date of Patent: Apr. 9, 2019

(54) AUGMENTING AND PRESENTING CAPTURED DATA

(71) Applicant: Microsoft Corporation, Redmond, WA (US)

(72) Inventors: Gregory Akselrod, Seattle, WA (US); Prashant Thiruvengadachari, Redmond, WA (US); Eun Ju Nam, Redmond, WA (US); Zaiqing Nie, Beijing (CN); Yong Cao, Beijing (CN); Pradeep Chilakamarri, Redmond, WA (US); Bernhard S. J. Kohlmeier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 832 days.

(21) Appl. No.: 14/470,491

(22) Filed: Aug. 27, 2014

(65) Prior Publication Data
US 2015/0046779 A1 Feb. 12, 2015

Related U.S. Application Data

(63) Continuation of application No. PCT/CN2014/081107, filed on Jun. 30, 2014.
(Continued)

(51) Int. Cl.
G06F 17/20 (2006.01)
G06F 17/22 (2006.01)
G06F 17/24 (2006.01)

(52) U.S. Cl.
CPC ........ G06F 17/2247 (2013.01); G06F 17/241 (2013.01); G06F 17/248 (2013.01)

(58) Field of Classification Search
CPC .................. G06F 17/3089; G06F 17/30867
See application file for complete search history.

(56) References Cited

U.S. PATENT DOCUMENTS 5,953,720 A 9/1999 Mithal et al.
7,007,034 B1 * 2/2006 Hartman, Jr. ..... G06F 17/30038
707/812
(Continued)

FOREIGN PATENT DOCUMENTS

CN 101237465 A 8/2008
CN 101490676 A 7/2009
(Continued)

OTHER PUBLICATIONS

Lerin, Marisa, "10 Tips to Using Evernote", Published on: Apr. 27, 2013 Available at: https://www.pixelscrapper.com/blog/10-tips-to-using-evernote.
(Continued)

Primary Examiner — Mohammed H Zuberi
(74) Attorney, Agent, or Firm — Talem IP Law, LLP

(57) ABSTRACT

Captured data can be transformed and augmented for a particular presentation in a document, such as a note of a notebook application, based on an identified entity for the captured data. The particular presentation of captured data can be provided based on entity detection, extraction, and knowledge base resolution and retrieval. Methods, systems, and services are provided that identify a primary entity of an item input to a notebook application and create an entity object for the primary entity of the item at least from one or more structured representations for content associated with the item. A template for presenting the entity object can be determined according to the primary entity, where the template is selected from a set of templates corresponding to different primary entities such that an arrangement and presentation for one primary entity is different than that of another primary entity.

19 Claims, 24 Drawing Sheets

Related U.S. Application Data

(60) Provisional application No. 61/863,241, filed on Aug. 7, 2013.

(56) References Cited

U.S. PATENT DOCUMENTS

| | | |
|---|---|---|
| 7,519,573 B2 | 4/2009 | Helfman et al. |
| 7,949,642 B2 | 5/2011 | Yang et al. |
| 8,135,589 B1 | 3/2012 | Reding et al. |
| 8,255,819 B2 | 8/2012 | Chang et al. |
| 8,286,076 B1 | 10/2012 | Szewczyk |
| 8,370,358 B2 | 2/2013 | Lin et al. |
| 8,429,099 B1 | 4/2013 | Perkowitz et al. |
| 8,504,583 B1 | 8/2013 | Ke et al. |
| 8,639,719 B2 | 1/2014 | Fisher et al. |
| 2003/0135464 A1 | 7/2003 | Mourad et al. |
| 2004/0220926 A1 | 11/2004 | Lamkin et al. |
| 2004/0223649 A1 | 11/2004 | Zacks et al. |
| 2005/0131778 A1 | 6/2005 | Bennett et al. |
| 2005/0138033 A1 | 6/2005 | Katta et al. |
| 2005/0216454 A1 | 9/2005 | Diab et al. |
| 2006/0041589 A1 | 2/2006 | Helfman et al. |
| 2007/0106952 A1 | 5/2007 | Matas et al. |
| 2007/0266342 A1* | 11/2007 | Chang ............... G06F 17/30867 715/810 |
| 2007/0288518 A1 | 12/2007 | Crigler et al. |
| 2008/0082349 A1 | 4/2008 | Zackrison et al. |
| 2008/0109832 A1 | 5/2008 | Ozzie et al. |
| 2008/0195664 A1 | 8/2008 | Maharajh et al. |
| 2008/0201452 A1 | 8/2008 | Athas et al. |
| 2008/0294981 A1 | 11/2008 | Balzano et al. |
| 2009/0113301 A1 | 4/2009 | Fisher et al. |
| 2009/0157711 A1 | 6/2009 | Baer et al. |
| 2010/0121877 A1 | 5/2010 | Fawcett et al. |
| 2011/0125784 A1 | 5/2011 | Cocheu et al. |
| 2011/0246937 A1 | 10/2011 | Roberts et al. |
| 2012/0023131 A1 | 1/2012 | Downey et al. |
| 2012/0066581 A1 | 3/2012 | Spalink |
| 2012/0076413 A1 | 3/2012 | Ferman |
| 2012/0117093 A1 | 5/2012 | Shilovitsky et al. |
| 2012/0144315 A1 | 6/2012 | Rosenberger et al. |
| 2012/0191728 A1 | 7/2012 | Libin et al. |
| 2012/0278080 A1 | 11/2012 | Singh et al. |
| 2013/0036117 A1* | 2/2013 | Fisher ............... G06F 17/30029 707/736 |
| 2013/0046761 A1 | 2/2013 | Soderberg et al. |
| 2013/0054371 A1 | 2/2013 | Mason et al. |
| 2013/0084000 A1* | 4/2013 | Bhardwaj .......... G06Q 30/0643 382/165 |
| 2013/0124513 A1 | 5/2013 | Bignert et al. |
| 2013/0173604 A1 | 7/2013 | Li et al. |
| 2013/0198642 A1 | 8/2013 | Carney et al. |
| 2013/0212463 A1 | 8/2013 | Pachikov et al. |
| 2013/0325870 A1 | 12/2013 | Rouse et al. |
| 2015/0046260 A1 | 2/2015 | Engebretsen et al. |
| 2015/0046493 A1 | 2/2015 | Akselrod et al. |
| 2015/0046827 A1 | 2/2015 | Akselrod et al. |

FOREIGN PATENT DOCUMENTS

| | | |
|---|---|---|
| CN | 103020619 A | 4/2013 |
| CN | 103177075 A | 6/2013 |
| CN | 103189835 A | 7/2013 |
| EP | 1843256 A1 | 10/2007 |

OTHER PUBLICATIONS

Yi, et al., "Eliminating Noisy Information in Web Pages for Data Mining", In Proceedings of the Ninth ACM SIGKDD International Conference on Knowledge Discovery and Data Mining, Aug. 24, 2003, 10 pages.

Yi, et al., "Web Page Cleaning for Web Mining through Feature Weighting", In Proceedings of the 18th International Joint Conference on Artificial Intelligence, Aug. 9, 2013, 6 pages.

Pan, et al., "Image Search by Graph-based Label Propagation with Image Representation from DNN", In Proceedings of MM'13, Oct. 21-25, 2013, 4 pages.

Dontcheva, et al., "Relations, Cards, and Search Templates: User-Guided Web Data Integration and Layout", In Proceedings of the 20th Annual ACM Symposium on User Interface Software and Technology, Oct. 7, 2007, 10 pages.

"Getting Started with Evernote Web Clipper" Retrieved Date: Nov. 27, 2013, pp. 2 Available at: http://evernote.com/webclipper/guide/#1.

"Search Report Issued in European Application No. 14834796.6", dated Mar. 7, 2017, 9 Pages.

Nguyen, et al., "Synthesizing Products for Online Catalogs", In Proceedings of the VLDB Endowment, vol. 4, Issue 7, Apr. 1, 2011, pp. 409-418.

"Office Action Issued in European Patent Application No. 14834796.6", dated Feb. 15, 2018, 6 Pages.

"Content Analysis Documentation for Yahoo! Search", Retrieved from: <<https://developer.yahoo.com/search/content/V2/contentAnalysis.html>>, Retrieved on: Apr. 2, 2013, 3 Pages.

"Evernote", Retrieved from: <<http://www.dsruption.com/evemote/a/5287d9337782650200000095>>, Retrieved on: Nov. 26, 2013, 4 Pages.

"Final Office Action Issued in U.S. Appl. No. 14/318,930", dated Feb. 20, 2018, 25 Pages.

"Final Office Action Issued in U.S. Appl. No. 14/318,930", dated Dec. 1, 2016, 18 Pages.

"Non Final Office Action Issued in U.S. Appl. No. 14/318,930", dated Jun. 27, 2016, 17 Pages.

"Non Final Office Action Issued in U.S. Appl. No. 14/318,930", dated Aug. 9, 2017, 24 Pages.

"Final Office Action Issued in U.S. Appl. No. 14/319,654", dated Oct. 27, 2017, 36 Pages.

"Final Office Action Issued in U.S. Appl. No. 14/319,654", dated Dec. 27, 2016, 43 Pages.

"Non Final Office Action Issued in U.S. Appl. No. 14/319,654", dated Jul. 11, 2016, 37 Pages.

"Non Final Office Action Issued in U.S. Appl. No. 14/319,654", dated Apr. 14, 2017, 38 Pages.

"Non Final Office Action Issued in U.S. Appl. No. 14/319,654", dated May 4, 2018, 27 Pages.

"Office Action Issued in European Patent Application No. 14753419.2", dated Mar. 6, 2017, 6 Pages.

"Oral Hearing Issued in European Patent Application No. 14753419.2", dated Dec. 21, 2017, 7 Pages.

"Office Action Issued in European Patent Application No. 14758726.5", dated Mar. 6, 2017, 6 Pages.

"Oral Hearing Issued in European Patent Application No. 14758726.5", dated Dec. 21, 2017, 7 Pages.

"Office Action Issued in Chinese Patent Application No. 201480044378.X", dated May 2, 2018, 10 Pages.

"First Office Action and Search Report Issued in Chinese Patent Application No. 201480044761.5", dated Aug. 15, 2018, 11 Pages.

"Office Action Issued in Chinese Patent Application No. 201480044794.X", dated May 2, 2018, 13 Pages.

Chakrabarti, et al., "Entity Tagger: Automatically Tagging Entities with Descriptive Phrases", in 20th International Conference Companion on World Wide Web, Mar. 28, 2011, pp. 19-20.

Dontcheva, et al., "Collecting and Organizing Web Content", in Personal Information Management—Special Interest Group for Information Retrieval Workshop, Aug. 10, 2006, 4 Pages.

"International Search Report and Written Opinion Issued in PCT Application No. PCT/CN2014/081107", dated Sep. 28, 2014, 13 Pages.

"International Preliminary Report on Patentability Issued in PCT Application No. PCT/US2014/050007", dated Nov. 25, 2015, 6 Pages.

"International Search Report and Written Opinion Issued in PCT Application No. PCT/US2014/050007", dated Dec. 15, 2014, 13 Pages.

"Second Written Opinion Issued in PCT Application No. PCT/US2014/050007", dated Jun. 12, 2015, 6 Pages.

(56) References Cited

OTHER PUBLICATIONS

"International Preliminary Report on Patentability Issued in PCT Patent Application No. PCT/US2014/050009", dated Jul. 30, 2015, 8 Pages.
"International Search Report and Written Opinion Issued for PCT Patent Application No. PCT/US2014/050009", dated Dec. 15, 2014, 13 Pages.
"Second Written Opinion Issued in PCT Application No. PCT/US2014/050009", dated May 27, 2015, 7 Pages.
"Non Final Office Action Issued in U.S. Appl. No. 14/318,930", dated Dec. 31, 2018, 25 Pages.
"Final Office Action Issued in U.S. Appl. No. 14/319,654", dated Jan. 8, 2019, 27 Pages.
"Second Office Action Issued in Chinese Patent Application No. 201480044378.X", dated Dec. 4, 2018, 12 Pages.
"Second Office Action Issued in Chinese Patent Application No. 201480044794.X", dated Dec. 5, 2018, 14 Pages.

* cited by examiner

AUGMENTING AND PRESENTING CAPTURED DATA

CROSS-REFERENCE TO RELATED APPLICATIONS

This application is a continuation of International Patent Application No. PCT/CN2014/081107, filed Jun. 30, 2014, which claims the benefit of U.S. Provisional Application Ser. No. 61/863,241, filed Aug. 7, 2013, which are hereby incorporated by reference in their entirety, including all figures, tables and drawings.

BACKGROUND

Collecting content for later access, organization, and modification is facilitated by a variety of webpage and user-generated content capture tools and their associated collection and curation applications such as Microsoft OneNote® and Evernote® notebook applications. A "web clipper" is a tool that generally runs on a web browser at a client to enable clipping of content from a web page displayed from a web browser. Other tools and input mechanisms may be used to gather and save content. For example, audio or video may be captured by a microphone and camera; and certain text may be captured by a keyboard, keypad, touchscreen, or mouse.

While within the notebook application, a user may annotate, tag, and otherwise organize the content captured into the notebook. Often a basic copy/paste or a screenshot/photo of content is captured into a notebook. For example, a capture of a webpage may often include advertisements and, in some cases, navigation bars and other elements of the webpage. Similarly, other input such as photographs may be directly captured by the notebook application as-is.

BRIEF SUMMARY

Captured data can be transformed and augmented for a particular presentation in a document, such as a note of a notebook application, based on an identified entity for the captured data. The particular presentation of captured data can be provided based on entity detection, extraction, and knowledge base resolution and retrieval.

Methods of presenting and augmenting information input into a notebook application can include receiving one or more structured representations for content associated with an item input to a notebook application, identifying a primary entity of the item, and creating an entity object for the primary entity of the item from at least the one or more structured representations of the item. The entity object can be presented in a user interface to the notebook application according to a template for the primary entity. The template can be selected from a set of templates corresponding to different primary entities so that an arrangement and presentation for one primary entity is different than that of another primary entity.

Systems and services can be provided for facilitating the entity-specific presentation of captured data. The system may include one or more servers supporting a notebook application capture service that can enhance the presentation of captured content based on a determined primary entity of the content. The service can create an entity object for a primary entity of an item input to a notebook application from at least one or more structured representations for content associated with the item. The entity object can include content extracted from the item as well as additional content retrieved for augmenting the captured data from the item.

Systems can also be provided in which entity objects for content associated with an item input to a notebook application can be displayed according to an entity-specific template. The system can request an entity object for content associated with the item input to the notebook application and, in a user interface to the notebook application, an entity-specific presentation of the entity object can be surfaced.

The item may be a uniform resource locator (URL), audio, video, image (photograph, graphic, etc.), word processing document, hypertext markup language (HTML) document, presentation document, Adobe® Portable Document Format (PDF), and the like. The primary entity of the item can be identified through an entity determination of content (or data) captured by, or otherwise input to, a notebook application. The entity object can be created from at least one or more structured representations of the item. In some cases, one or more structured representations of the content (e.g., from the content source, a knowledge base, or both) can be used to facilitate the identification of the primary entity of the item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
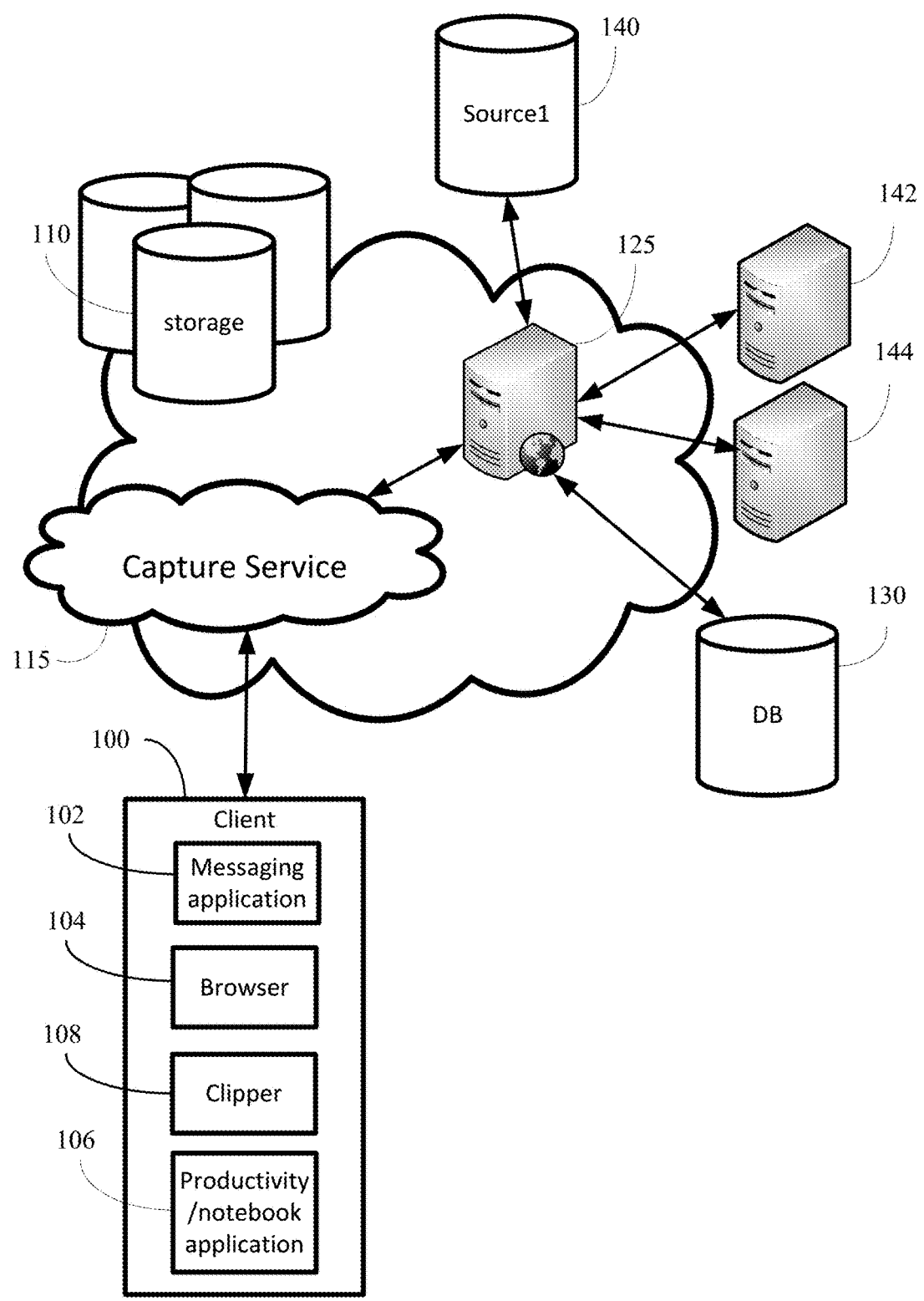
FIG. 1 illustrates an operating environment for capturing data.

Captured data can be transformed and augmented for a particular presentation in a document, such as a note of a notebook application, based on an identified entity for the captured data. The particular presentation of captured data can be provided based on entity detection, extraction, and knowledge base resolution and retrieval.

The item may be a URL, audio, video, image (photograph, graphic, etc.), word processing document, HTML document, presentation document, PDF, and the like. The primary entity of the item can be identified through an entity determination of content (or other data) associated with the item and captured by, or otherwise input to, a notebook application. The content can be, for example, audio, photos, video, formatting, style, layout and/or text from a webpage or other document file type (which includes file formats of HTML, PDF, Microsoft Word® document (DOC), Office Open Extensible Markup Language (OOXML) format (DOCX) and the like).

In some cases, document understanding technology may be used to parse the content in order to identify and understand objects on the page (e.g., entity type determination). This way it is possible to understand what is on the page, for example, if the content is about a movie, a book, a recipe, a business contact, etc.

An entity may refer to a person, place, thing, event, task, or concept. An object of an entity references a tangible form of the entity. An entity is a strong entity type if it has at least one specified attribute and is not dependent on another entity. For example, "The Lord of the Rings" names an object of a "book" entity type that can be defined with attributes that may include title, author, and International Standard Book Number (ISBN) number. The "book" entity can be considered a strong entity type, whereas "ISBN" is dependent on the book and would not be considered to be a strong entity type.

Since there can be many entities identified from content, a primary entity refers to the main or dominant entity that can be used to define content. For example, a primary entity may be "book," "recipe," "business card" or other specific entity that, when determined to exist in the captured content, facilitates in the selection of a template for presenting the entity object created for the content. It is not necessary for all entities to have a corresponding template. In some cases, a default template may be used for those primary entities that do not have a specific associated template (or templates).

In some methods a service makes an entity determination from content associated with an item input to a notebook application and creates an entity object of structured data, such as an entity container described herein, which provides an object and one or more attributes (attribute elements) of the object. In some implementations, the entity container further includes service elements. A service element can enable a user to take an action related to the entity (e.g., purchase an item, set calendar events, share and recommend an item). The services available for the service elements can be made available from a variety of online services. The attributes of the object can be obtained from multiple sources across the Internet.

An entity object can be created using one or more structured representations of the item. Both the terms "entity object" and "entity container" may be used interchangeably herein to refer to the augmentation of captured content into a particular structured format tied to an identified primary entity. The one or more structured representations may include models (or topic cards) created by web data services to describe (and store information about) a website and/or one or more web pages. In addition to those provided by web data services, structured representations may be found in knowledge bases or available from the content source (e.g., built in to a web page or other document referenced by or included as the item input to the notebook application). In some cases, one or more structured representations of the content (e.g., from the content source, a knowledge base, or both) can be used to facilitate the identification of the primary entity of the item.

In certain implementations, elements on a page (or retrieved from sources at various locations) can be arranged into structured data so that the information can be shown (e.g., rendered) in a contextual appropriate way. Templates can be provided so that the entity objects that are created for an item input to the notebook application can be presented based on the identified primary entity. That is, a transformed view of the thing (i.e. the entity) the user is trying to capture can be presented and stored. This can also be adjusted for the device (for example, depending on available bandwidth, display screen size, viewing application, and other client-specific characteristics).

For a URL, the website page (or other document) can be transformed for presentation based on a primary entity identified from the website page. An entity object can be created for the content of the website page (or other document) and presented according to a template associated with the primary entity. For example, a primary entity of a recipe can result in the selection of a recipe template for presenting an entity object created for the recipe that makes it possible for a user to check off the use or purchase of ingredients from a list of the ingredients.

For an image, if the image is able to have information be extracted and be classified as an identifiable entity, an entity object can be created for the content of the image and the content of the image can be transformed for presentation based on the identified primary entity. For example, an image identified with having a primary entity of a business card can be transformed into a table of information about the person of whom the business card provides contact information. Additional information not found in the image (or the content of the website page or other document), but relevant to the primary entity, may be obtained through a knowledge base. For the business card example, supplemental information about the person may be obtained from a social media site such as LinkedIn®.

Advantageously, certain implementations provide the ability to capture structured content and maintain its semantics all the way though capture, recall, and reuse. This enables the user to capture what is truly of interest to the user and store it in a preferred location and format. Furthermore, upon recall, relevant information can be accessible at the right time and place.

Augmentation and other enhancements to content being collected, authored, consumed, or clipped are described. Entry points for the services providing augmentation to content can be, for example, from clippers, readers, document or image viewers, word processing and other productivity applications, collection and curation applications, and messaging applications.

Techniques are described that provide a user with content capturing options that recognize the subject matter of the content being captured and supply additional information relevant to the captured subject matter that is otherwise not immediately available to the user at the time of capture. This augmentation, along with other enhancements, can be automatic or performed in response to a user's request. Augmentation services are presented that may be provided as part of a capture service (e.g., a service associated with a notebook application such as Microsoft OneNote® or Evernote®).

In some cases, the augmentation occurs at the time of collection (e.g., as a user is clipping content from a web page or following the input of an item to a note). In some cases, the augmentation can be performed while a user is modifying or manipulating content in a document, for example, in a note of a notebook application. In some cases, the augmentation can be performed when content is being saved into a document. Other cases may be suitable for automatic or user-requested augmentation as well.

The augmented content can include more specific and/or relevant content to that which is provided in an item. The capture services facilitate the augmentation of content by accessing additional information relating to the content and/or manipulating the content in custom and convenient ways.

The augmentation of the content can further facilitate taking action with the item, the primary entity, the object of the primary entity, the entity object or the attributes of the entity object. In addition, enhanced user experiences can be facilitated through understanding the subject (entity) that is being collected. Certain implementations apply structure and semantics to the user's notes in order to enhance the entire experience.

FIG. 1 illustrates an operating environment for capturing data. Referring to FIG. 1, a capture service 115 can facilitate entity determination and augmentation of a clip or other item input to a notebook application to include entity-related features and/or functionality. As part of the entity determination, entity recognition can be performed with respect to the content being captured. This process may be performed locally at a client 100 or as part of the capture service 115.

A capture service 115 of an embodiment performs some processing to customize or augment the clipping for an application. The capture service 115 can provide augmentation services (either directly or indirectly) and may provide an application programming interface for augmentation services. The augmentation services may be provided integral with or independently of capture.

The capture service 115 can be web service that may be hosted in the cloud or run by one or more allocated servers by an entity providing the notebook service or the capture service.

A cloud service generally refers to hosted services providing scalable processing and storage capabilities. Cloud computing may often include virtualized resources. The resources presented by cloud computing are in themselves provided as a service, where cloud computing customers rent usage of resources from a third-party provider that owns the physical infrastructure. Web services can be provided and/or hosted by a cloud service (e.g., as part of a large-scale distributed computing environment). A web service is a software system that supports interoperable machine-to-machine interaction over a network and enables software to connect to other software applications.

A web service provides a collection of technological standards and protocols. For example, a web service provides functions that may be implemented by a software or hardware agent that sends and receives messages (e.g., the computing platforms requesting and providing a particular service). Applications can access web services via ubiquitous web protocols and data formats such as hypertext transfer protocol (HTTP), XML, JavaScript Object Notation (JSON), and SOAP (originally an acronym for simple object access protocol). The systems, applications and services described herein may exchange communications in accordance with one or more application programming interfaces (APIs).

Client(s) 100 can be used to browse the Web and run applications such as a messaging application 102, browser 104 and, in some cases, a productivity application or a reader or notebook application 106.

The messaging application 102 may be, but is not limited to an email application, an application supporting short message service (SMS) communication, or an application supporting multimedia messaging service (MMS) communication. Examples of messaging applications 102 include native applications available through an operating system (e.g., Apple® iOS messaging, Apple® IMessage, Android® OS messaging, Windows® messaging), messaging apps (WhatsApp, Facebook®, Facebook® Messenger, Microsoft Skype™, Windows® Live Messenger, Google® Hangouts, Handcent SMS, Hello SMS, Go SMS, KaKao Talk, Blackberry® Messenger), and email applications (Microsoft Outlook®, Google Gmail®, Gmail® App for Android™, MailDroid™, TouchDown™, Yahoo!®, Mail). In some cases, content can be sent to the capture service 115 as a recipient of a message sent from the messaging application 102. For example, a user can send a message to "me@onenote.com" to add the content of the message to their notebook account.

Examples of browsers 104 include Microsoft® Internet Explorer, Google Chrome®, Apple Safari®, and Mozilla Firefox®. Examples of productivity applications, readers, and notebook applications 106 include Microsoft® Office, Microsoft OneNote®, Evernote®, Google Drive™, Google® Reader, Apache® OpenOffice, Zoho® Office, Apple® Reeder, and Apple iWork®.

A clipper 108 is locally running application that can be used to collect and capture content (including augmented content) for a user. Through the clipper 108, a user can select to clip the whole page, extracted portions of the whole page, one or more regions of the page and/or a recognized object/entity of the page (in the form of an entity container). The clipper 108 may be a web clipper, a clipping tool running on an operating system, an application having a clipping feature, or an augmentation feature of a notebook application, as some examples. The clipper 108 may also be available as an option for sharing photographs on the client 100. The clipper 108 may or may not be directly associated with a destination application for the content.

A web clipper typically clips content from a website and inserts the content into a note or other application to which the clipper is associated. Web clippers generally run on a web browser 104 at a client 100. The web clipper may be implemented in JavaScript, as an example, and can be interoperable (and in some cases integrated) with the web browser 104. Because each web browser has different capabilities, web clippers may be configured based on the web browser.

In some cases, the clipper 108 may include a software tool associated with an operating system on a computing device (such as a tablet) that can be invoked to determine the entity that is most dominant on the screen at the time. For example, a touch or non-touch gestural swipe may be used to invoke the tool and get the entity (and in further implementations get the entity container for the dominant entity). As another example, a keyboard button (such as Print Screen) may be depressed to invoke the tool and get the entity.

In some cases, the clipper 108 is included as an add-on, plug-in, or bookmarklet for the browser 104 to clip content rendered in the browser 104. A bookmarklet is an extended functionality for a web browser, usually in the form of a JavaScript program stored as part of a bookmark in a web browser (or hyperlink on a web page). In some cases the clipper may be included as a feature of the operating system (not shown) to capture any content being rendered on a display (similar to a print screen function). In some cases, the clipper may be included as a web function or add-on of the productivity or notebook application 106.

In various embodiments, the clipper 108 can collect and capture content that is then stored in the "cloud" storage 110 or at another remote (non-local) destination. The cloud refers to the storage and systems that are made available to a user over the Internet as part of a hosted service. The captured content may be stored locally at the client as well.

Content can be sent to a user's note or other application document through the messaging application 102 and/or the clipper 108. The note or other application document may be stored in the cloud (e.g., as storage 110). In some cases, a local copy of the note or other application is available. The note or other application document may be accessed or associated with the application 106 running on the client. The clipper 108 can provide content from the browser 104 (or some other application) to multiple notes and/or other application documents, as well as present additional functionality and enhancements through the capture service 115. The capture service 115 can also provide functionality and enhancements for content sent through the messaging application 102.

When using the capture service 115 to recognize an entity (or more than one entity) from the content, the capture service 115 may interface with the cloud storage 110 and/or destination storage (e.g., enterprise server or other specific remote storage) (not shown), for example by providing the content (and any enhancements or augmentation of the content) to the cloud storage 110 and/or destination storage.

In some implementations, as part of the augmentation (and object entity creation), the capture service may communicate with a web data service 125 to obtain information from a database 130 of related structured content (also referred to as "structured knowledge" or a "knowledge graph"). The database 130 may be aggregated and hosted by search engine providers such as Google® and Bing®; however other knowledge base databases that are accessible over the Internet, other networks (private and/or public), or even on a user's local machine may be used. In one implementation, the capture service 115 can obtain structured content from database 130 directly.

In some cases, the related structured content can be generated on the spot. In one such case, the capture service 115 can communicate with a search engine service to perform a search. The search engine service can retrieve information from a variety of sources across the Internet (e.g., sources 140, 142, 144). In some cases, the search engine service may be separate functionality provided by the same provider of the web data service 125. In other cases, the search engine service may performed by a different provider.

The capture service can include an API to enable any application to capture an entity on a page, get an entity package (including associated template), and even store the entity package for a designated application (or at a storage location associated with a user and accessible by one or more applications). In some cases, where the page is a web page (or portion of a web page), a card can be obtained by the capture service from a search engine service. The capture service can detect the entity (or entities) of the page from the card.

The application or clipper can request to the service whether there is a recognizable entity for a page or document. The service can determine the dominant object (or objects) and provide an entity container for the object. The primary entity (based on the dominant object or objects) can be determined and an entity object can be created for the entity container. The entity object can be presented according to a template corresponding to the primary entity.

The capture service 115 may be implemented using one or more physical and/or virtual servers communicating over a network. In some cases, the capture service 115 may store or maintain an address of the clippings provided from the clipper 108 in the storage 110. The captured content (including entity containers) can be accessed directly from storage 110 or through the capture service 115 for inserting into different types of documents. In some implementations, other clients and servers may communicate with the capture service to utilize the functionality available from the capture service without using the clipper 108.

The various networks described and/or shown as part of the environment illustrated in FIG. 1 can include, but are not limited to, an internet, an intranet, or an extranet, and can be any suitable communications network including, but not limited to, a cellular (e.g., wireless phone) network, the Internet, a local area network (LAN), a wide area network (WAN), a WiFi network, an ad hoc network or a combination thereof. Such networks may involve connections of network elements, such as hubs, bridges, routers, switches, servers, and gateways. The network may include one or more connected networks (e.g., a multi-network environment) including public networks, such as the Internet, and/or private networks such as a secure enterprise private network. Access to the network may be provided via one or more wired or wireless access networks as will be understood by those skilled in the art.

Figure 2:
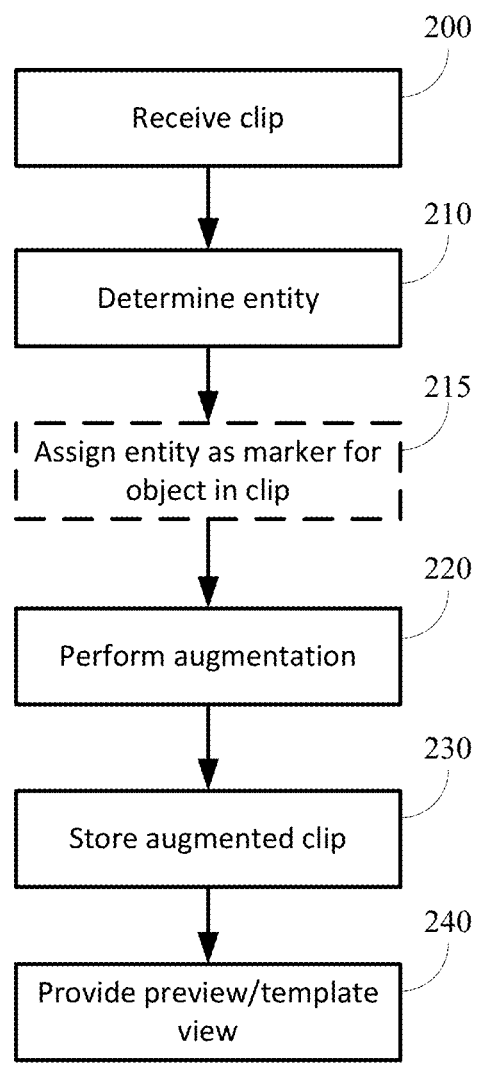
FIG. 2 illustrates a process flow diagram of an implementation.

FIG. 2 illustrates a process flow for facilitating automatic augmentation according to an implementation. Referring to FIG. 2, in response to receiving a clip or other item (e.g., URL, image) for input to a notebook application (200), an entity determination can be performed (210).

The entity may be automatically resolved or a user may select the type of entity. In some cases, a combination may be appropriate, for example where there is not enough information to determine with a certainty above a threshold that the dominant object is a particular entity.

In some cases, the clip includes a marker or tag indicating the entity type. When the clip includes the indication of entity type, the entity determination can include reading the tag or marker.

In some cases, the entity determination includes analyzing the content of the clip to determine the entity of the clip. The entity of a document or web page can be identified in response to receiving the clip. The entities being identified for use in this case are the strongly typed entities. Any suitable technique for identifying a dominant entity may be used. For example, classification, image recognition, text mining, semantics, and ontology frameworks may be utilized to identify dominant (and non-dominant) entities from a string or other content format.

In some cases, the entity determination involves contacting a search engine service (or other web data service) to request information about a URL, for example, in the form of a "topic card" (defined here as structured and unstructured information about the entity), which can include an indication of the entity (or entities) associated with a web page. In some cases, multiple "topic cards," or models, may be available for a URL.

After the entity is determined (210), the content being collected ("clipped") or otherwise input to a notebook can then be associated with the strongly typed entity in the form of a marker (215). Although this step is illustrated as occurring before performing augmentation (220), the assignment of the marker may be performed at any time after the entity is determined, including after performing augmentation, at a time of storing the clip, and even after providing a preview of the clip.

The marker is similar to a "tag" that can be stored as part of the metadata of the document or page. The marker may even be used as a tag. However, the marker can be associated with an element or object within the document or page as well as the metadata of the page itself. In addition, the marker facilitates additional functionality specific to being a recognizable entity and, in some cases, includes a schema providing a specified structure for attributes of the object being marked. That is, different from a tag, the entity marker presents a standard schema of how to store information related to that entity. While any metadata can be added to describe a page, tagging tends to not be uniform.

In some cases, there may be multiple entities on a same page. For example, a search results page may have multiple wines. As another example, a blog post may include a recipe (one entity) and an article (another entity) about a region visited by the author. Multiple objects of a same entity type or multiple objects of different entity types can be recognized and stored in their corresponding structure (i.e., entity object).

In some cases, the entities associated with content may each have a confidence value and the content may be marked as an entity with a confidence value above a certain threshold. In some cases, multiple strong entities may exist on a page or document. The individual sections can be marked with their corresponding entity and the page or document as a whole may be marked with the multiple entities.

In some cases where the captured content may include multiple entities (or a situation where it is not possible or easily achievable to narrow results to a single entity based on the content that is captured), the entity determination can include outputting a list of available entities understood by the capture service and determining the entity in response to receiving a selection of one of the available entities. In some cases where an object may exist in different entity forms, for example as a book and a movie, a feature can be included that enables a user to correct or select the entity being referred to. This situation may arise when there are two or more entity types that are applicable to the same general subject matter.

Once an entity is determined (210), augmentation can be performed according to the entity (220). The augmentation can be creation of an entity container (also referred to as an "entity object"), an entity-related processing, or a combination of the two.

The entity container (or "entity object") refers to the package of information having a structured schema specific to the entity type. The entity container can be generated in response to receiving a request for an entity container from an application (or clipper) or automatically generated in response to receiving the clip or some other specified event invoking augmentation. The entity container presents a structured collection of data based on a determination of the dominant entity (or entities) of a clip (which may be an entire page or a region selection of a page). When multiple entities are found on a page, each may be identified and their corresponding structured collection of data presented (and/or stored).

A strongly typed entity container is not simply a keyword (or keywords) describing the object. Instead, the entity container provides "what" the thing/object is (e.g., a "book"); provides action(s) that may be taken on the entity (e.g., read reviews about a "book"); enables access to the entity container (e.g., made available to third parties that have permission to access "book" or provide tags for queries); and enables actions to be performed (e.g., "books" can be sent to a wish list of an online book store).

In some cases, the entity container can be generated from one or more cards (or "models") received from a search engine service. The card can include the entity information as well as various attributes related to the object of the entity. Since the search engine service has already analyzed the page and prepared a card, additional analysis to determine an entity associated with the captured content from the local application or the capture service may be omitted.

When the URL of a web page is used to request the associated entity from the search engine service, the card provided for indicating the entity can also be used to generate the entity container.

For the entity-related processing, the clip can be processed or transformed in a number of ways. In certain implementations, the processes can include removing advertisements from main content of a web page or looking up entity tags embedded in HTML of a page by the page author. In some cases, the transforming can include separating readable text from the rendered content to generate an image from the readable text. In some cases, the transforming can include providing hyperlink recognition so that internal links shown in the image can be made "live" and selectable. In some cases, the transforming can include removing repetitive background content from the rendered content. The transforming can be any combination of the above or other types of transformational processes including filtering, text recognition, image recognition, and tagging.

The entity may be determined at the client (as part of a process at the clipper) or at the capture service. When captured through a clipper, a preview can be rendered for the clip, and the preview may show the augmentation available for the clip. When an item is input to a note, the entity determination can be performed automatically or in response to a user command.

The augmented clipping can be stored (230) and, optionally, provided to the client in a preview (240). In some implementations, a customized view (or format) can be presented based on a recognized entity. In some cases, the entity container structure with the appropriate content for the specified attributes can be arranged in a particular manner. For example, a presentation of a book entity type can include an arrangement that fits within a rectangle (or other shape) of certain proportions with an image of the book cover at one location, a summary of the book in a specified font at another location, the author's name at yet another location, and the ISBN number at a bottom location.

In some cases, a service element may be included at a particular location. This service element may be a graphical representation of, for example, a "buy now" request to launch online bookseller sites or a synopsis request to launch a study guide application. As other examples, a "movie" can include a service element to purchase a ticket, and an "airline ticket" can include a service element that displays up-to-date information on flight status.

Once the entity type is recognized—or as part of the process of recognizing the entity type for a clip, the capture service can obtain elements (attribute elements and service elements) that relate to the object of the entity from one or more sources.

According to various implementations, the capture service can provide the relevant information (the elements) in a form suitable for the particular entity type. This form can be a package of elements that make sense in relation to the identified thing (i.e., the entity"). A difference between tagging and entitizing is that determining the one or more entities in a document or on a webpage generates a layout or format specific to the entity as opposed to simply providing additional metadata for the file. Text, audio, images, and video can be captured by the application and the subject of this content can be captured.

In certain implementations, the entity container schema can be configured according to an ontological database or catalog such as available from schema.org—a public repository of schematizing the world. The schema can include a list of properties associated with an object. The list of properties can then be used to get information to fill out the schema. Layout templates may also be included so that the view of the entity container (with filled attributes) may be consistent but can be customized for each client or context (e.g., how the information is presented in the preview pane or on a mobile phone).

There are a number of entry points for users to capture data into a notebook (and associated storage). A capture service can provide a variety of enhancements, functionality and features to make things easier, more efficient, and more useful (and even more pleasing) to a user of the notebook application and associated services. One function of the capture service is to capture information provided by a user and store the information for later retrieval and use by the user. A capture service described herein can include multiple services and/or can work with other services provided by a same or different provider.

Figure 3:
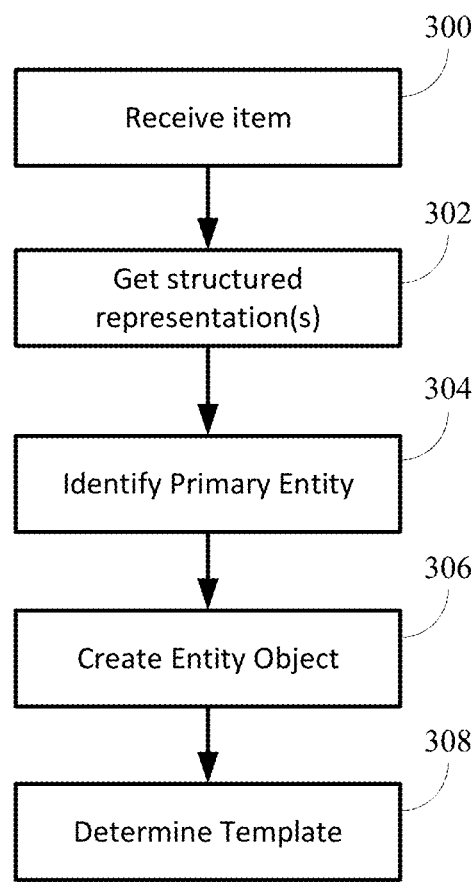
FIG. 3 illustrates a functional diagram for an example capture service.

A function of the capture service described herein is to augment captured content. FIG. 3 illustrates a functional diagram for an example capture service. Referring to FIG. 3, the capture service can perform a method for augmenting and presenting captured data by identifying one or more primary entities and creating an entity container or "entity object" for each identified primary entity of the captured data. This can be accomplished by the capture service getting one or more structured representations for content associated with an item input to a notebook application. For example, the capture service can receive an item (300) and then get one or more structured representations for content associated with the item (302). In some cases, the item is used to capture additional content that is used to obtain authoritative or structured representations. For example, content extracted from a document or image can be used to look-up structured representations in a knowledge base (and even be used to generate search results through a search engine service). As another example, a URL can be used to perform a look-up in a web data service index.

In some implementations, the structured representations can include models requested from and provided by web data services (e.g., available from many search engine service providers). The models are sometimes referred to as topic cards, scrape results, and structured results; accordingly, such phrases may be used interchangeably. The capture service can request the models from a web data service (or more than one web data service) by providing a URL (which, in some cases, may be the only content that was input to the capture service). Multiple queries may be made for the URL and multiple models may exist for a URL.

The structured representations may alternatively, or in addition, include models maintained by the capture service (or a related service), from the item itself (e.g., by extracting information from the item when the item is an image or document or by accessing content associated with the item which contains or provides structured representations.

In some cases, from the one or more models provided, the capture service can compare the model results to determine if there is a primary entity and, if so, identify the primary entity (304). Often, a model contains, as structured data, a number of properties, or attributes. The structured data maps to an ontology which can be used to determine whether there exists (with respect to the content associated with the item) an identifiable entity. The capture service can perform logic, using a minimum number of attributes existing as part of the structured representation of the item to determine with some probability that there is an identifiable entity. For example, a model indicating that the content associated with a URL includes a title, a list of ingredients, and at least one step can be identified as a recipe.

An entity object for the identified primary entity can be created from the one or more structured representations (306). When multiple models are received, the model results can be compared to determine if there is an entity (e.g., a minimum number of attributes mapped to an ontology) and attributes appropriate for that identified entity can be retrieved and/or populated. Some models may involve different filtering of data and thus can include different attributes even when storing the structured information for a same original reference document (e.g., a URL for a web page may be stored with multiple models, each possible containing different attributes).

Figure 4:
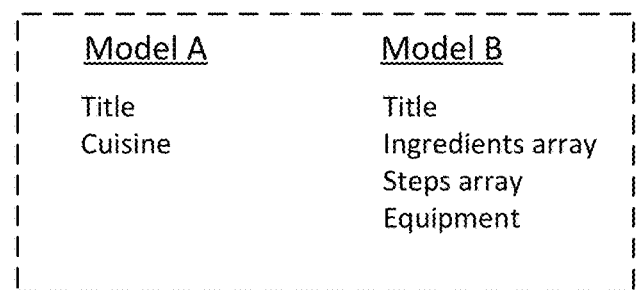
FIG. 4 illustrates entity object creation from multiple models.
Figure 4:
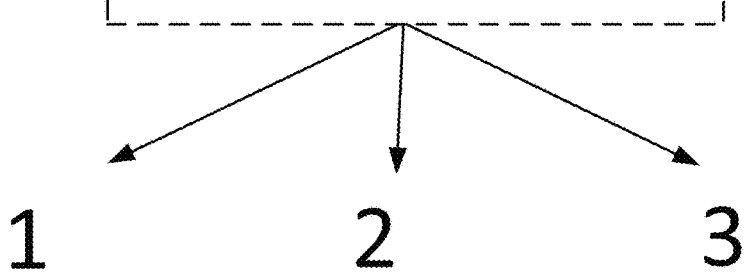

FIG. 4 illustrates entity object creation from multiple models. Referring to FIG. 4, the capture service may receive two models, Model A and Model B, as the one or more structured representations of an item. The capture service may choose a "best" fitting model by selecting one of the models according to a selection criteria. The selection criteria may involve logic determining a model having a most number of attributes (e.g., as shown by the selection of Model B in case 1), a model having a minimum number of attributes mapping to a particular ontology, and/or any other suitable selection criteria. In some cases, the capture service can combine models, for example as in case 2 where the attributes of both Model A and Model B are incorporated as part of the entity object. In some cases, the entity object can be formed by a selection of particular attributes from any or all of the models, such as shown in case 3. Models may be received from a web data service and/or retrieved from an associated knowledge base or other database.

Returning to FIG. 3, an appropriate template can be determined (308) to map the data from the entity object to a more aesthetic and/or useful form on a page. In some cases, the capture service can perform a look-up or other mapping technique to determine the appropriate template. The determination of an appropriate template can be performed upon request of a client at the time the item (and note) is being displayed.

Figure 5:
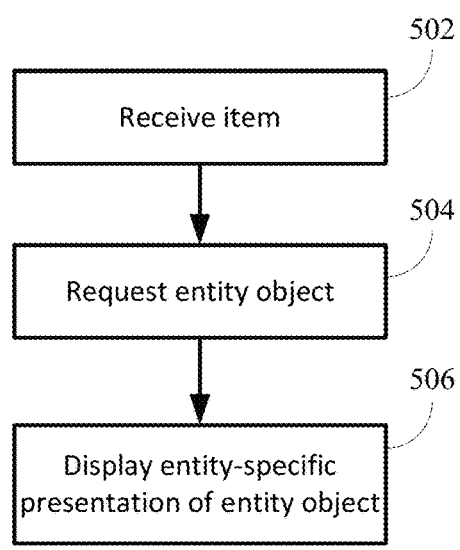
FIG. 5 illustrates a functional diagram for a system having a user interface.

FIG. 5 illustrates a functional diagram for a system having a user interface. Referring to FIG. 5, an item may be received (502) at a system, for example at a client device with a user interface to a client application such as (but not limited to) a notebook application. In response to a command, or automatically by request of the client application to receiving the item, an entity object can be requested (504). An entity object for the item can be received and an entity-specific presentation of the entity object can be displayed in a graphical user interface of the user interface to the client application (506). The arrangement for the entity-specific presentation can be controlled by the template for the primary entity identified for the item.

Figure 6:
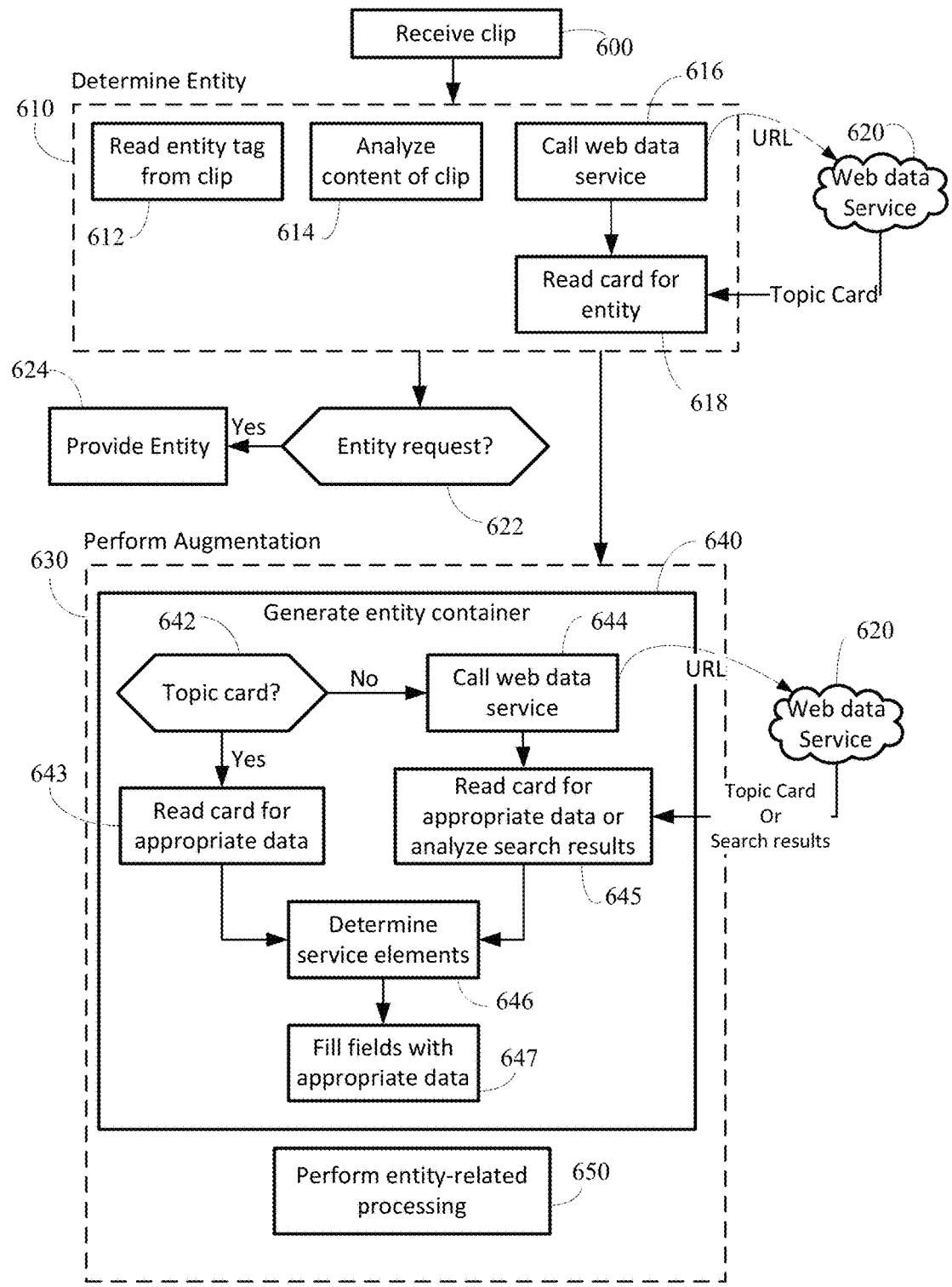
FIG. 6 illustrates an example process flow for a capture service according to an implementation.

FIG. 6 illustrates an example process flow for a capture service according to an implementation. A clip of a web page or other document may be received (600) at the capture service in order to perform augmentation. Once received, the entity or entities of content on the page or other document is determined (610). Determining the entity of an object in a clip may be accomplished by reading an entity tag from the clip (612), analyzing the content of the clip (614), and/or calling a web data service (for example available from a search engine provider) (616) by sending the URL of the clip as part of the request to the web data service 620. In some cases, when analyzing the content of the clip (614), the entity determination can be accomplished by analyzing the HTML dominant object model (DOM) of the clipped web page (or other document). In some cases, when using the topic cards from the web data service 620, the entity can then be determined in operation 618 when the one or more topic cards (the structured and unstructured information about the entity/entities on the page) are received from the web data service 620. If the capture service received an entity request (622), then the entity determined in operation(s) 610 can be provided to the application/device that made the request.

As part of the augmentation process, information received from the web data service (and/or search engine service whether same or different providers) can be used to create an entity container. Information from the clip itself can be used to populate the entity container and facilitate the creation of the entity container.

The creation of an entity object (e.g., "augmentation") may be carried out in parallel to or in serial with entity determination. In some cases, entity determination occurs as a result of or as part of the entity object creation process. In some cases, the result of the entity determination directs the object creation process.

As an example, during operation 616, when the capture service calls the web data service 620 with the URL, the web data service 620 can provide a cached version of the properties of the webpage identified by the URL stored in a database of the web data service. The database stores the webpage properties as structured data. If the database contains the information associated with the URL, then the capture service can receive the properties stored in the database (in the form of a card). The entity determination can be read from the card (618) and the card information can be used to generate the entity container (640). For example, if a topic card is received (642) (because of being requested during operation 616), the card can be read for the appropriate data (643). The entity container may be the card or may be a modified version of the card provided by the web data service.

If the capture service does not yet have the topic card, the capture service can call the web data service 620 with the URL (644), and, in response to receiving the topic card(s) from the web data service, the capture service can read the card for appropriate data (645). In some cases, a card is not available for a URL or the document (or other item received by the capture service) does not have a cached version stored in the database for some reason (e.g., no URL may have been provided or is available).

In the case that no card is available (and even in the case that a card is available), the capture service can call a search service (which may be provided by the same provider of the web data service) and request a search be performed (see also operations 644 and 645). The request can include key words generated by the capture service based on the clip. The keywords generated by the capture service include the dominant entity or entities determined by analyzing the content of the clip. In some cases, tags that were automatically generated and/or tags that were user-assigned to the clip can also be used to populate the request for the search.

In response to receiving the request for the search, the search service can provide results of the search in a form of a curated card providing structured attributes of the entity. For example, when the keyword is the name of a composer, the curated card may include a picture of the composer, date of birth, family members, famous works and, in some cases, other composers either commonly searched or of some other relationship to the composer. This type of curated card is currently being used on search engine sites to enhance certain search results; however, certain embodiments can provide this functionality outside of the search engine web site and without requiring a user to enter search terms.

That is, the capture service determines the entity that the user intends to capture from a page, makes the connection to the search service, which may only receive key words, receives the card from the search service, and generates an entity container from the card as well as other information requested and received from a variety of sources across the Internet. For example, service elements may be included in the entity container and upon determining the desired and/or available service elements (646), the fields of the entity container can be filled with the appropriate data (647). The augmentation can also include performing entity-related processing 650.

The capture service can, in addition to relying on search engines, identify key entities itself via natural language processing and related statistical and/or heuristics-based techniques.

Figure 7A:
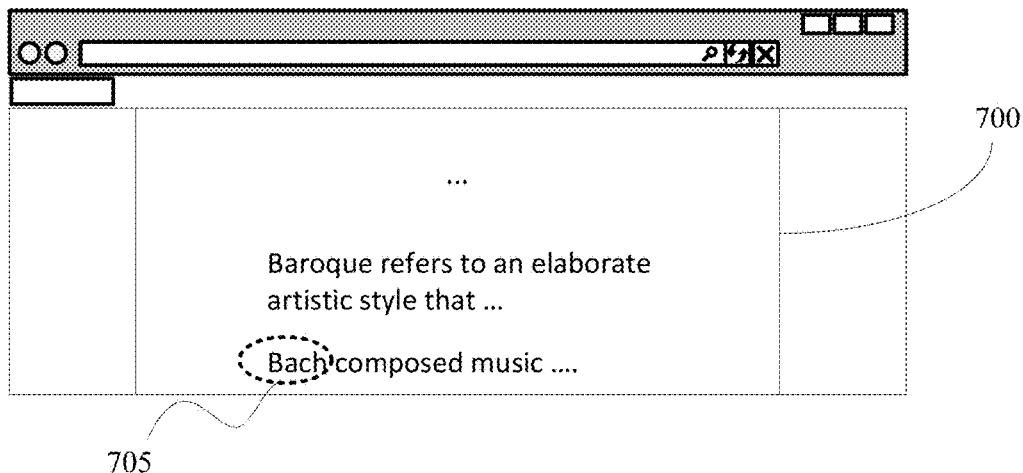
FIGS. 7A and 7B illustrate an example scenario in which a recognized entity in a web clipping is assigned an entity container.
Figure 7B:

FIGS. 7A and 7B illustrate an example scenario in which a recognized entity in a web clipping is assigned an entity container. Referring to FIG. 7A, a user may be conducting research on the Baroque period for a school course. While viewing a web page 700, the user may decide to clip the page to a note.

According to an implementation of the automatic augmentation technique, an entity container can be generated for the dominant entity or entities of the web page 700. When invoking the capture service, the dominant feature of the webpage may be determined and this dominant feature associated as a strongly typed entity (also referred to as a "strong entity type"). More than one entity may be recognized on a page.

A dominant entity on the page 700 may be Johann Sebastian Bach (705). The determination of the dominant entity may be performed at the clipper (locally) or at the capture service. In some cases, the user may indicate the entity of interest; whereas in other cases, the entity determination is performed in the background and/or without user input.

The capture service can, in response to determining that the dominant entities on the page include the composer Johann Sebastian Bach, generate an entity container. The clipping can be captured into storage with the entity container(s) for the recognized entity (or entities). The entity containers can be available for strong entity types recognized on a page of a clipping.

The entity container 710 shown in FIG. 7B may be rendered at the user's device as a preview. It should be understood that the entity container shown in FIG. 7B is merely illustrative of elements that may form an entity container and should not be construed as requiring the elements shown or limited only to those shown. Referring to FIG. 7B, the entity container 710 may include the composer's name attribute element 711, a summary attribute element 712, an image attribute element 713, a life span attribute element 714, a relationship/spouse attribute element 715, a compositions attribute element 716, a children attribute element 717, a parents attribute element 718, and a "listen now" service element 720.

What follows are a number of screen shots associated with aspects of the subject disclosure as provided with respect to a computing device. Such screen shots are merely exemplary and provided to graphically depict at least one embodiment of aspects of the disclosure. Of course, the subject disclosure is not intended to be limited to the location or presentation of graphical elements provided since there are a myriad of other ways to achieve the same or similar result.

It should be understood that these case examples are meant for illustrating how certain features may be implemented and should not be construed as limiting in layout, functionality, features, or scope.

Figure 8A:
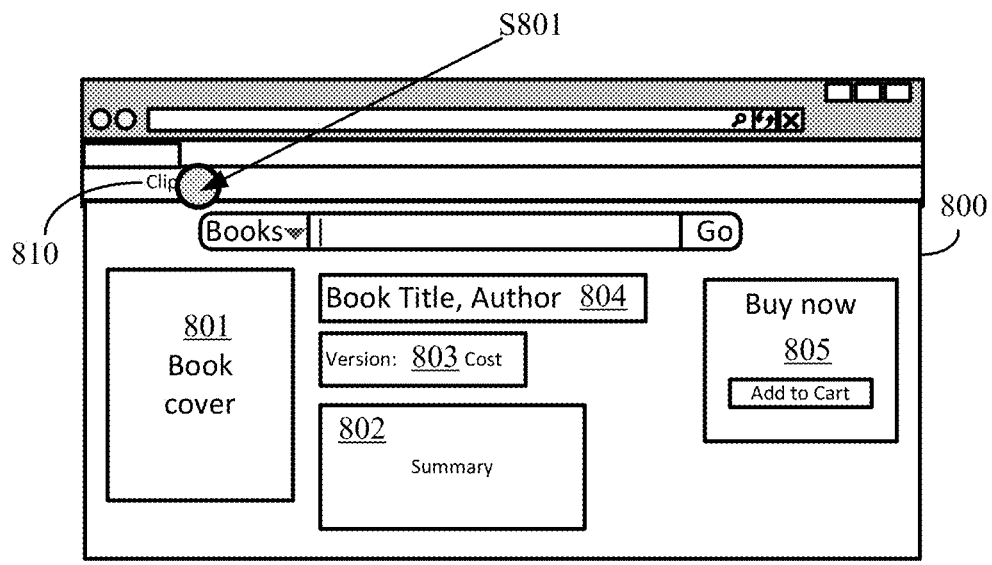
FIGS. 8A-8E illustrate user interfaces for a process flow of an example scenario according to an implementation.

FIGS. 8A-8E illustrate user interfaces for a process flow of an example scenario according to an implementation. In an example scenario, a user, Joy, is browsing an online bookstore and comes across a book she would like to read. Joy can use a clipping tool to clip the book information into her notebook application. For example, as shown in FIG. 8A, Joy may be viewing a webpage 800 for a book on which a book cover 801, summary 802, version(s) and cost 803, and book title and author 804 may be presented. The book may be available for purchase with the transaction available through a purchase link 805. When Joy selects (S801) to clip the page (via clipper 810). The clipping may be of the page, a region of the page and/or a dominant entity of the page.

Figure 8B:
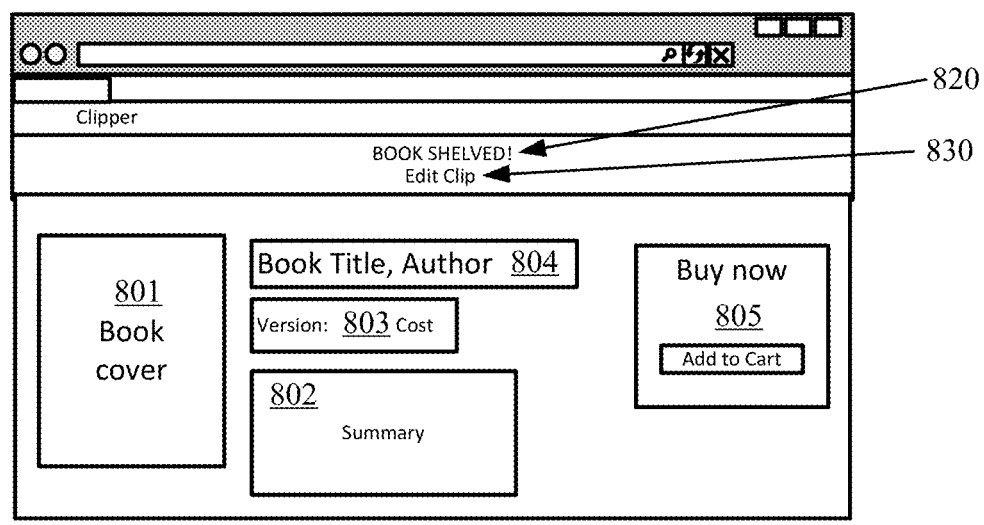
Figure 8C:
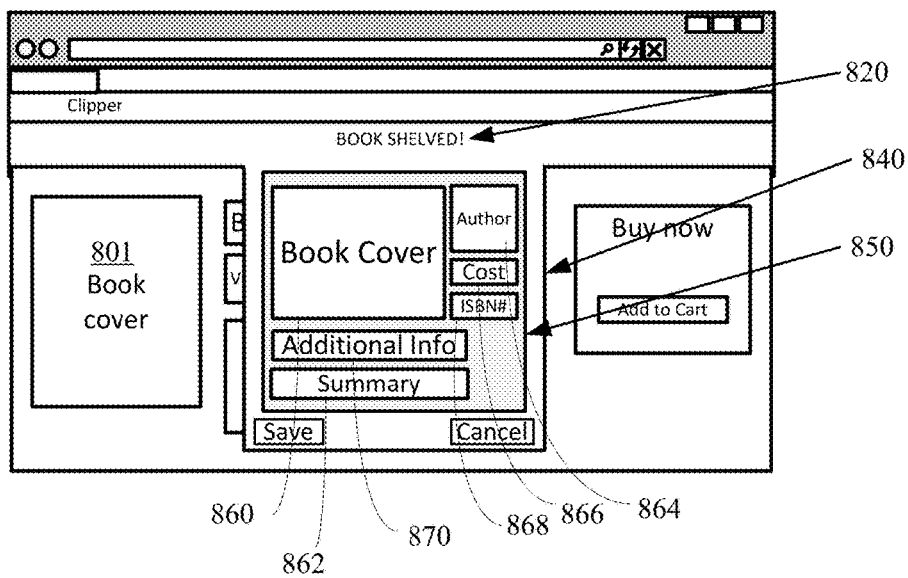
Figure 8D:
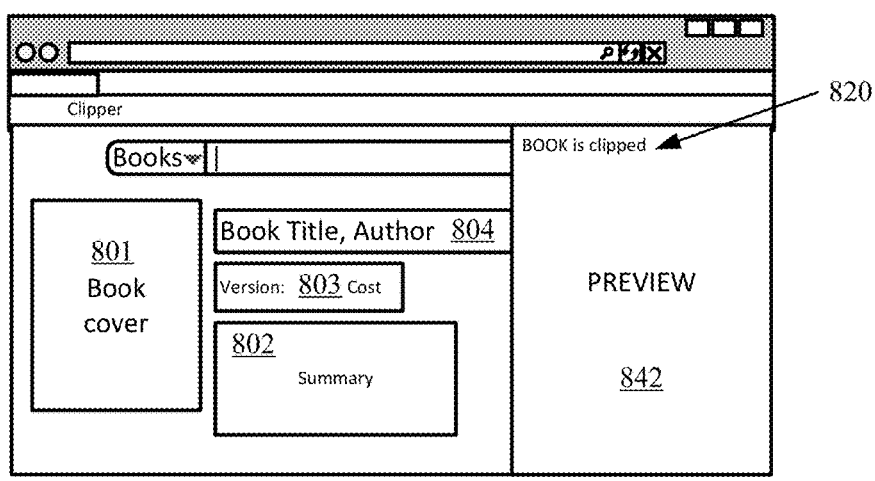
Figure 8E:
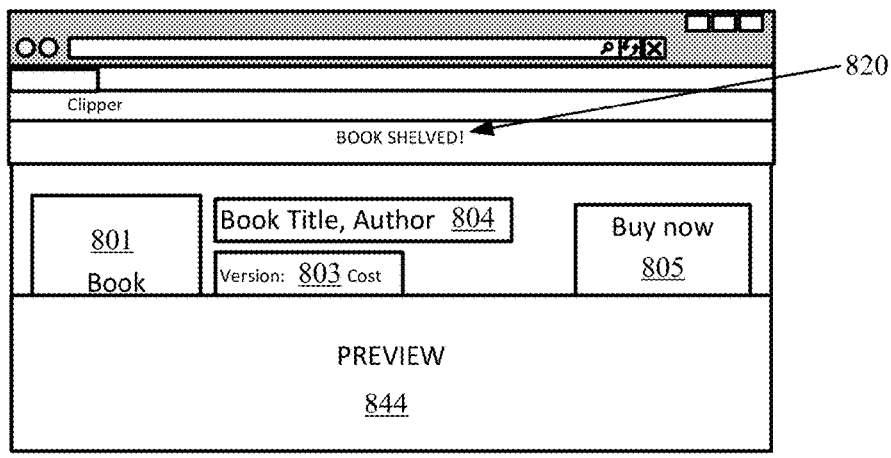

As shown in FIGS. 8B and 8C, in response to clipping the page 800, because the capture service recognizes the dominant entity of the page 800 as being a book, the clipper can display a designated response 820 indicating that the recognized entity is a book. The clipping may be edited from within the clipper, for example, an "edit clip" command 830 may be selected or modifications may be made from within a preview pane (e.g., preview pane 840). The preview pane 840 may or may not be automatically displayed when clipping a page (or portion of the page). FIGS. 8D and 8E illustrate two of many alternate preview pane configurations. FIG. 8D shows a right panel preview pane 842 and FIG. 8E shows a bottom panel preview pane 844.

Returning to FIG. 8C, a book entity container 850 can be displayed according to a corresponding template in the preview pane 840. The book entity container may provide attributes including, but not limited to, a book cover 860, summary 862, author information 864, cost 866, ISBN 868, and additional information 870. Some of the information for the attributes may be obtained from the webpage content itself. Other information for the attributes may be obtained from one or more external sources. The template provides an enhanced presentation for the identified entity (of book) using the information from the entity container.

Figure 9A:
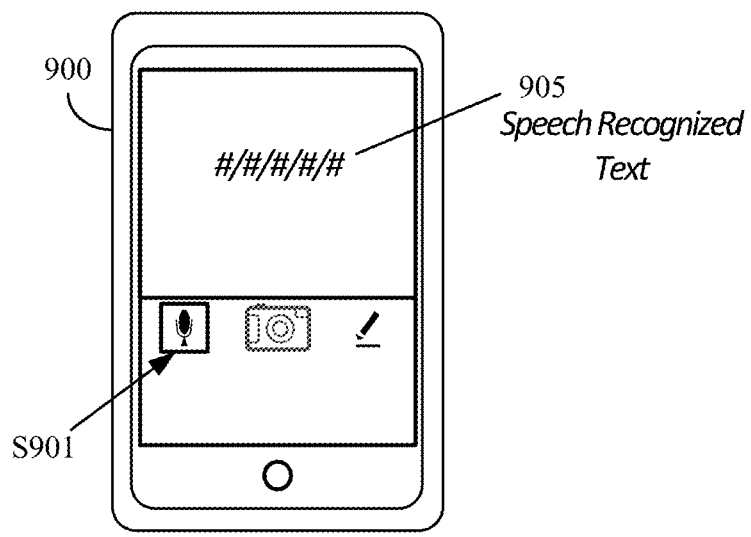
FIGS. 9A-9G illustrate an example scenario according to an implementation.

A user case sequence is illustrated in FIGS. 9A-9G. Referring to FIG. 9A, a user may be talking with a friend who tells her that she must read a certain book. So the user speaks into her cell phone 900 to record (S901) the name in her notebook application as a quick note. In some cases, speech recognized text 905 can be displayed within the note. After receiving this input, the notebook application can (as part of a synching process, in response to a command by the user, as part of some automated process activated by the receipt of content into the notebook application, or other reason) access or call the capture service to request entity recognition.

In this example case, the capture service may indicate that the entity may be a book or a movie and, as a result, the recorded name may have a marker attached indicating that the entity may be the book or the movie (and optionally the corresponding confidence values).

Figure 9B:
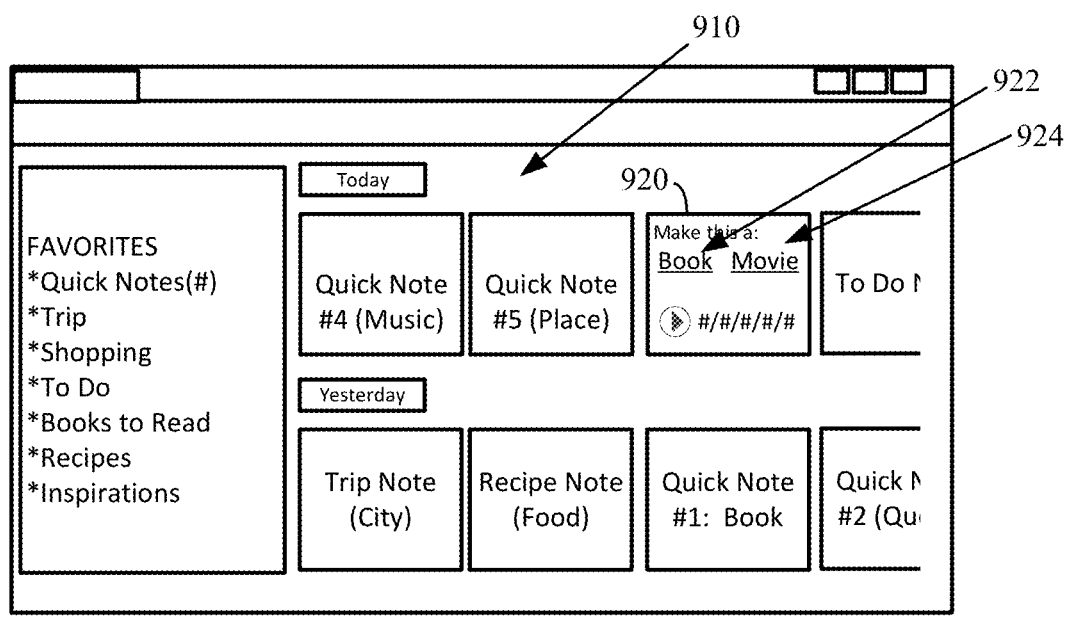

Then, referring to FIG. 9B, when the user opens her notebook application 910, the quick note entry 920 can appear. Because the content of this quick note resulted in two possible entity types, the user can, in this example, select the entity type, book 922 or movie 924, intended for the content.

Figure 9C:
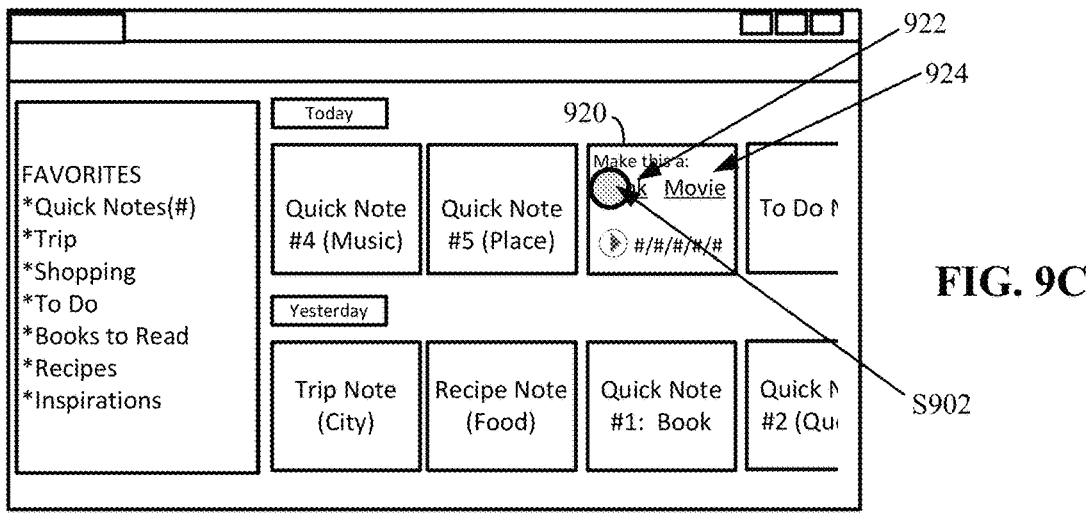
Figure 9D:
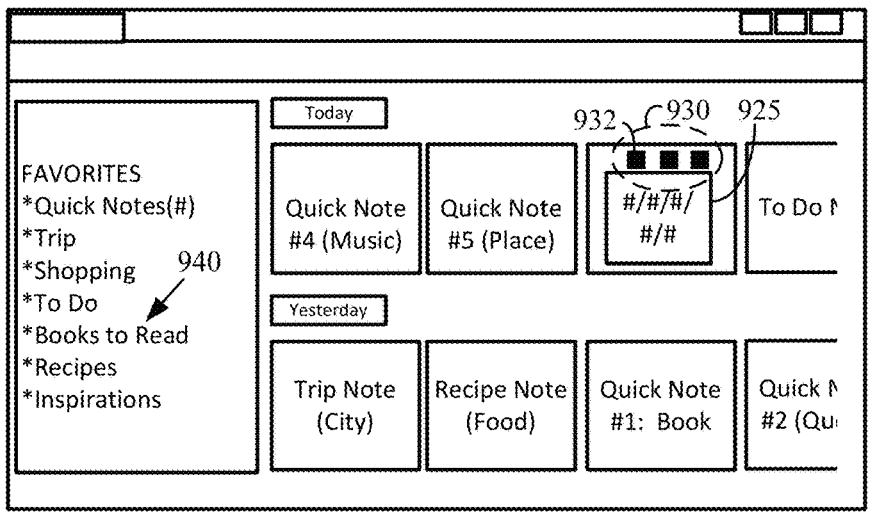

As shown in FIG. 9C, the user selects "book" (S902). This selection can mark the quick note content with the entity marker of "book," which can result in the container "book" being applied to the content. The application of the container can include the notebook application requesting a book container for the named book from the capture service. For this example, as shown in FIG. 9D, when a "book" is recognized in the notebook application, a template can be applied for presenting this entity object. As illustrated, a book cover 925 (received as part of the book container) can be displayed and certain functions 930 may be available to the user, for example, the book can be indicated as being able to be moved 932 to a notebook of books to read 940.

In some implementations, the marking of "book" can also enable another application (which may be a third party application), such as a reader to perform an action on the content in the notebook application. This action can be "to read," for example to determine the books named in the notebook and get the text from another source so that when the user opens the reader, the book can be available for reading. Similarly, a student study guide application may read the books named in the notebook and present a pamphlet style or synopsis for the user. In one example where a study guide application has permission to access "books" in a note, a user taking notes during class within the notebook application may either have the entity recognition occur automatically or upon the command (for example by selection of text or graphical user interface element of the notebook application) by a user. When a "book" entity is recognized from the note (because of a dominant entity determination that may be carried out at the client or via a capture service the client communicates with), the "book" can be stored. The "book" may be stored separately from the note or as a marker or tag for the note.

In further implementations, the entity container can be obtained and stored as well. Because the study guide application can access "books," and may also access the storage space to which the note (with book marker) or the "book" (separately) is stored, the study guide application can provide a synopsis to the user for that book. This may occur, for example, while the user is in class and taking notes or at a later time when the user accesses the study guide application.

These extended actions can be possible because of the marking of content with a strongly typed entity.

As one example, a book recommendation application (e.g., a social network related to discussing books) can be linked to a user's notebook application. When a book is rated on the book recommendation application, a book entity for this book can added to a "Books I've read" list in the notebook application so that when books are searched in the notebook, the recommended book can automatically be included in the notebook with relevant information. Conversely, when a book is added to the notebook application, the book may be marked as "Want to read" on the book recommendation application.

Figure 9E:
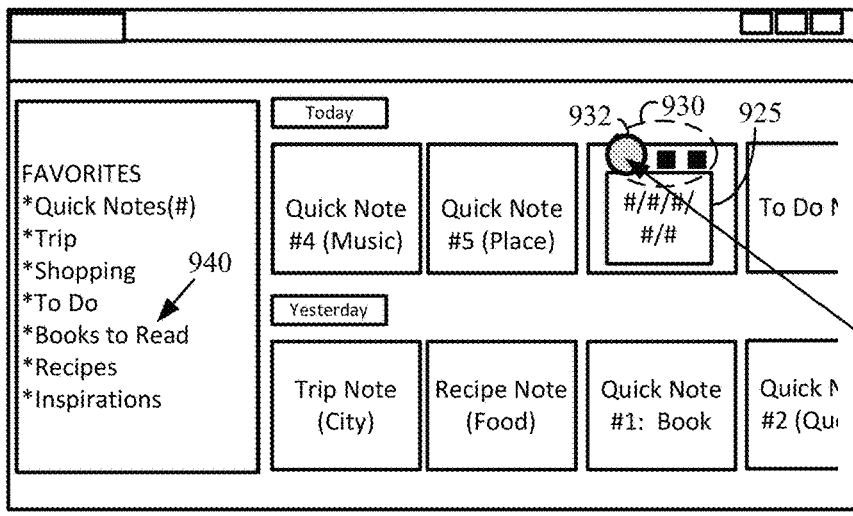
Figure 9F:
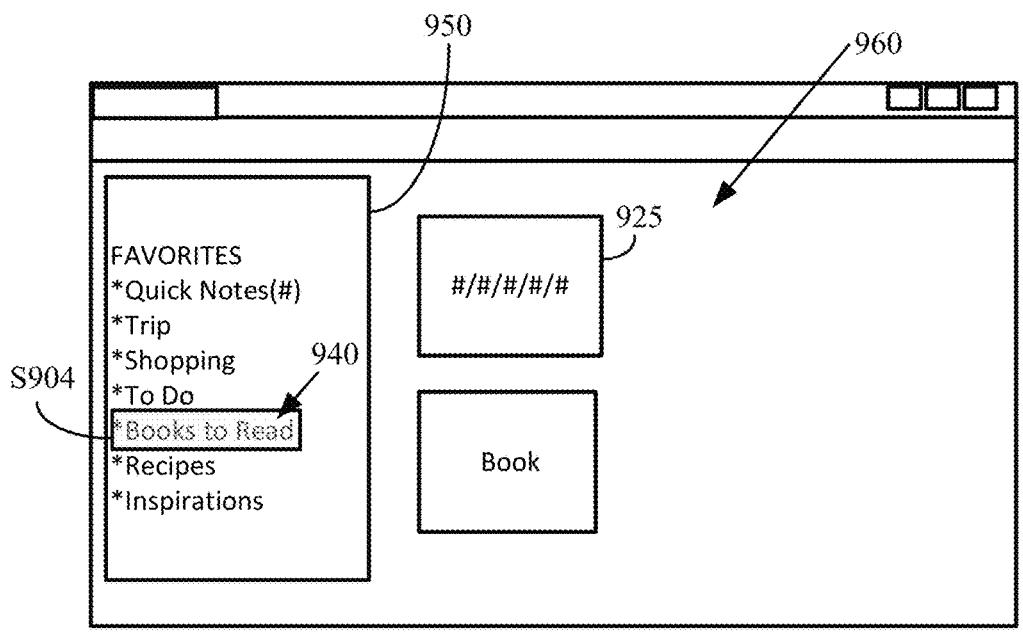
Figure 9G:
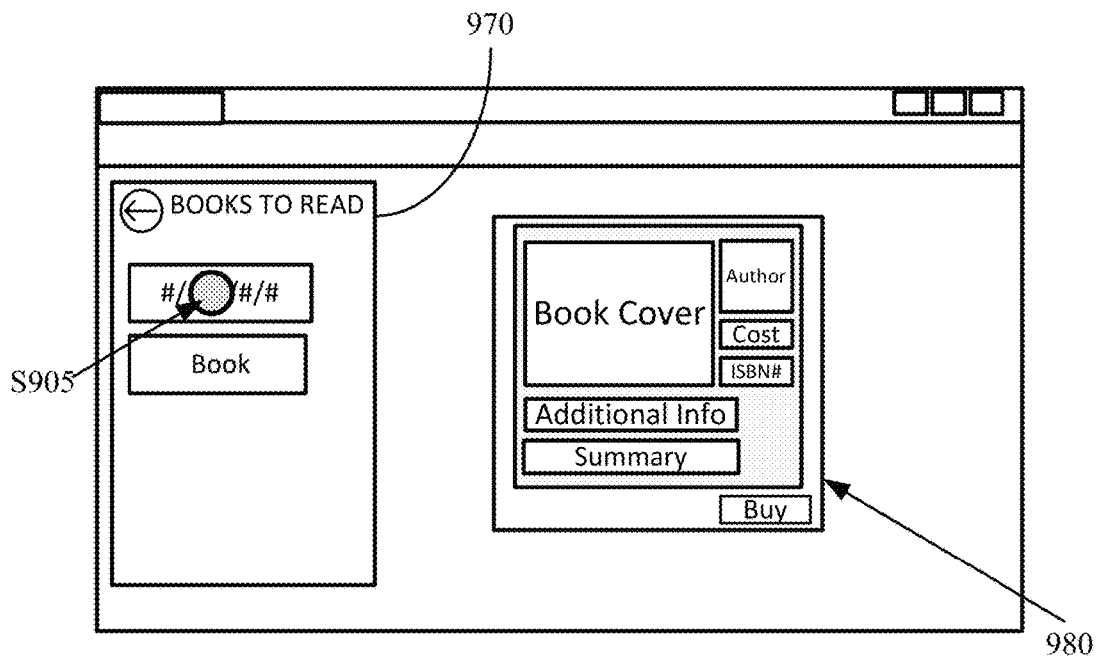

Referring to FIG. 9E, the user may select (S903) the function 932 for moving the item to the books to read 940 file. A "books to read" preview 960 may be available when the "books to read" 940 item on the menu 950 is initially selected (S904) as a filter as shown in FIG. 9F. Then, referring to FIG. 9G, after the user selects (S904) "books to read" 940 from the menu 950, the books to read page is displayed and the user can select the named book from a menu 970. In response to receiving the named book selection (S905), the book container 980 can be displayed. The container 980 can include the genre, the star rating, and a brief description of the book, all displayed without leaving the notebook application. In some implementations, actions may be taken on the item from the note. For example, in some cases, a "buy" button may also be included that can link back to one or more online retailers. In some cases a "read" button or other task related selection may be included so that the user can distinguish between books read and books to be read without having to delete the books from the notebook. The book container 980 can be the same or similar to the book container preview 850 shown in FIG. 8C.

Figure 10A:
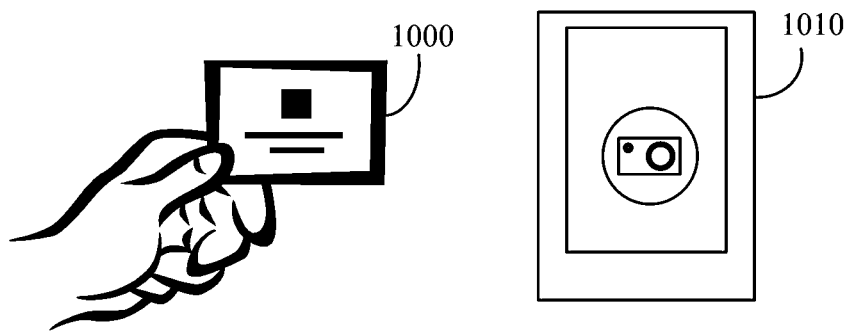
FIGS. 10A-10D illustrate a scenario for capturing and presenting an image item.
Figure 10B:
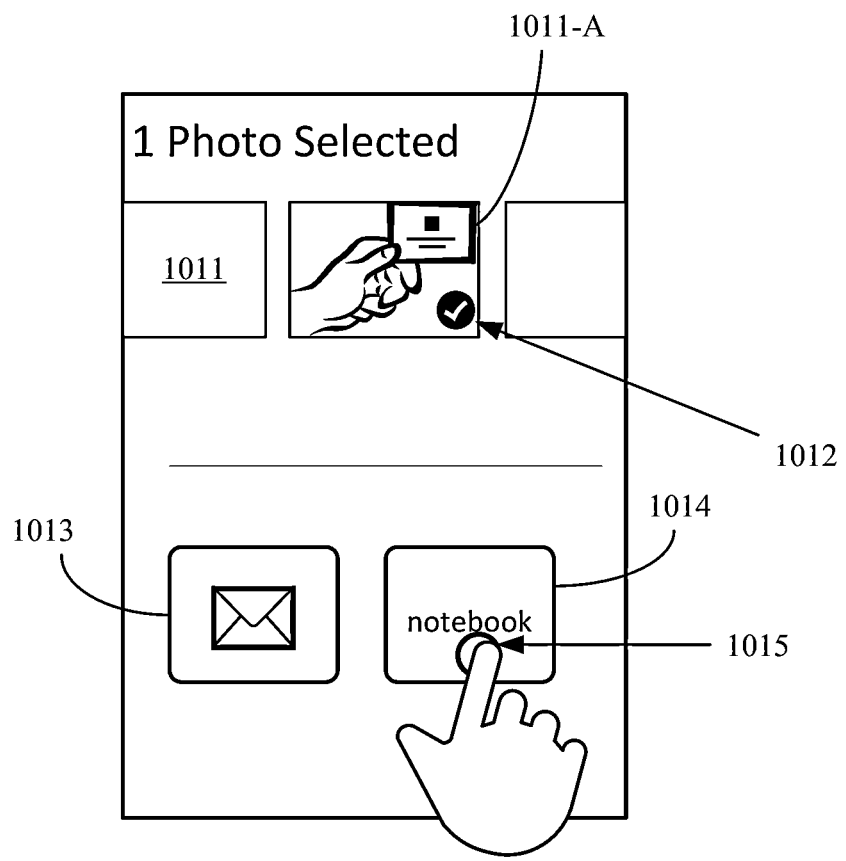

FIGS. 10A-10D illustrate a scenario for capturing and presenting an image item. Referring to FIG. 10A, a user may be at an event and meet a potential business contact. To capture the information about this potential business contact, the user may take a picture of the business card 1000, for example with their smartphone 1010.

The operating system of the phone 1010 may enable user's to view their photographs 1011 and select one or more of the photographs (e.g., selection 1012 of image 1011-A), and attach/send a copy of the photograph (via email, text, post, or other application or social media). The operating system can also enable certain applications to access the photographs. In this example, the options for the user include email 1013 and notebook application 1014. Thus, in the example scenario illustrated at FIG. 10B, when browsing through their photographs 1011 on the phone 1010, the user may elect to share (1015) the business card image 1011-A to their notebook application 1014.

Figure 10C:
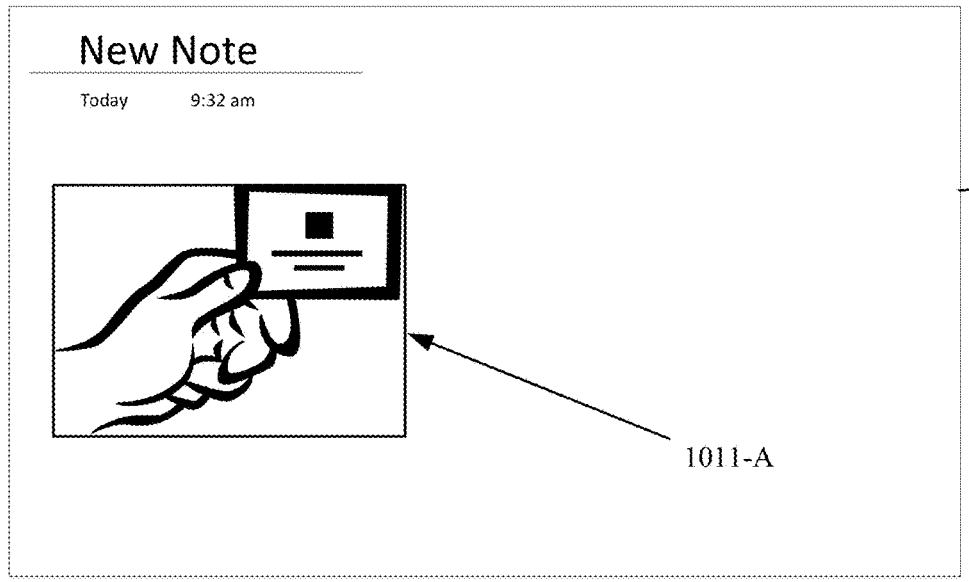

Then, as illustrated in FIG. 10C, when the user accesses their notebook—either on their smartphone 1010 or some other computing device, a copy of the image 1011-A can be seen in a new note 1020. In some cases, the user can select a command to augment the image. In other cases, the image is augmented before presented to the user for display in a note. In one implementation, the user may simply have copied and pasted the image to the note instead of sent via the sharing function from their phone 1010.

Figure 10D:
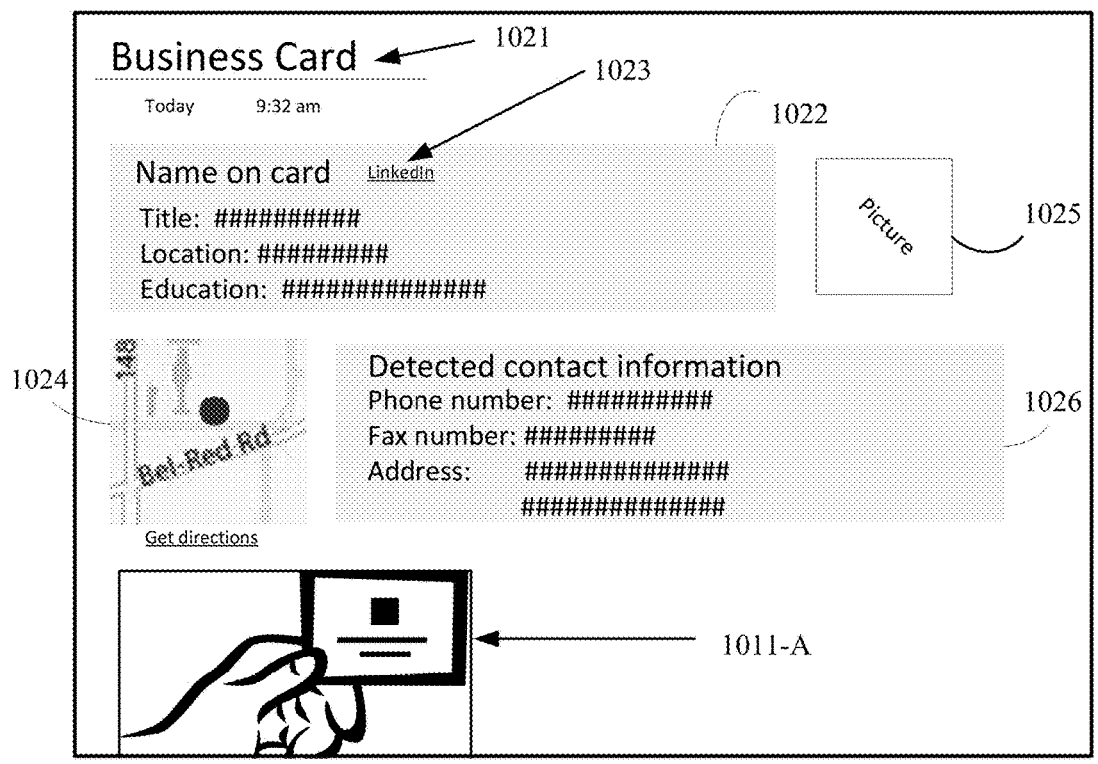

Referring to FIG. 10D, the notebook application, via the capture service, can augment and present the captured data in a pleasing and useful manner. For example, optical text recognition may be performed to extract information from the image 1011-A. The course-grained captured content can be used to perform a look-up in a knowledge base. For example, at least one "name" from the extracted information can be resolved against information stored in a knowledge-base. To "resolve" a name refers to the determination of the specific person, object, or other entity to which the name (alpha-numeric) refers.

The extracted data can be used to classify and identify entities. Once the content is identified as a business card (e.g., the primary entity is a business card), the entity object for the business card can include numerous attributes and structured content obtained directly from the image as well as resolved against and/or retrieved from the knowledge base. In some cases, the note title 1021 may automatically update with the title of the identified recognized entity. The template for the business card entity object can include a table 1022 with editable text that has a link 1023 to LinkedIn (or other networking site), a map for location 1024, a picture of the person 1025, a table 1026 or other arrangement of the extracted information, and numerous other attributes depending on the particular template created for the business card entity object.

Figure 11A:
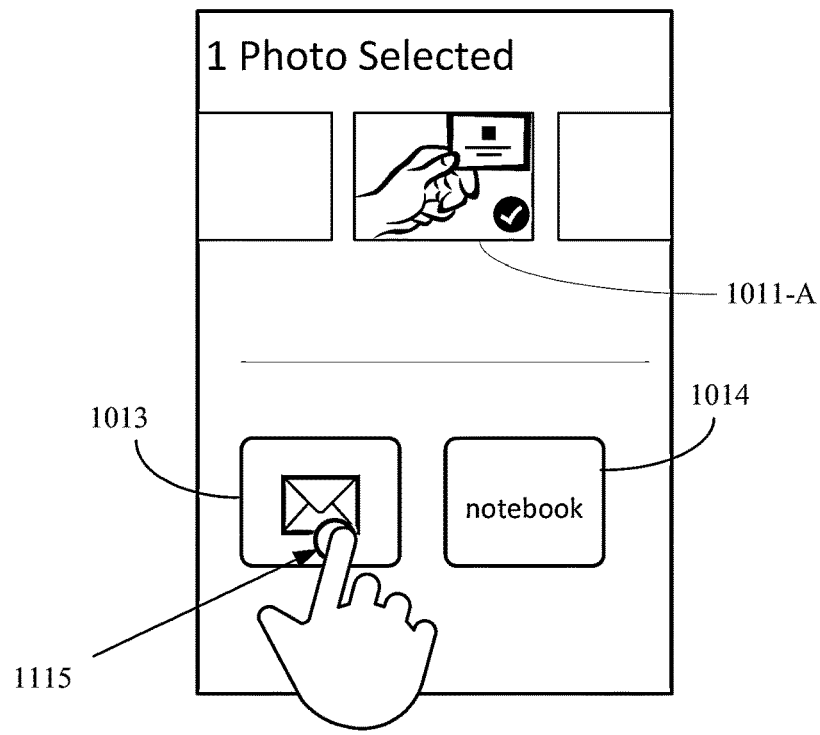
FIGS. 11A-11C illustrate another scenario for capturing and presenting an image item.
Figure 11B:
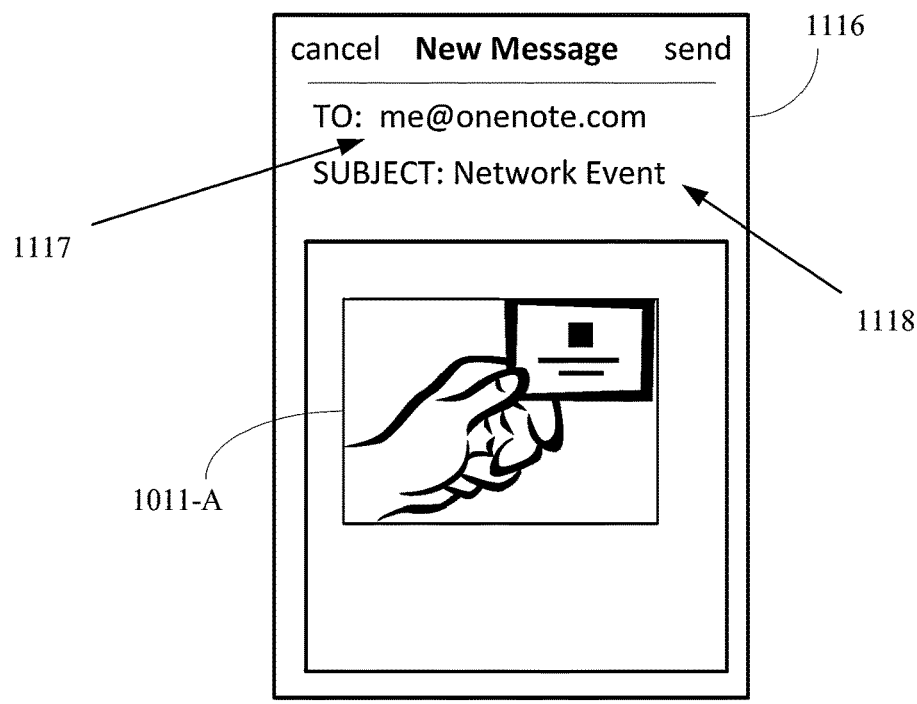
Figure 11C:
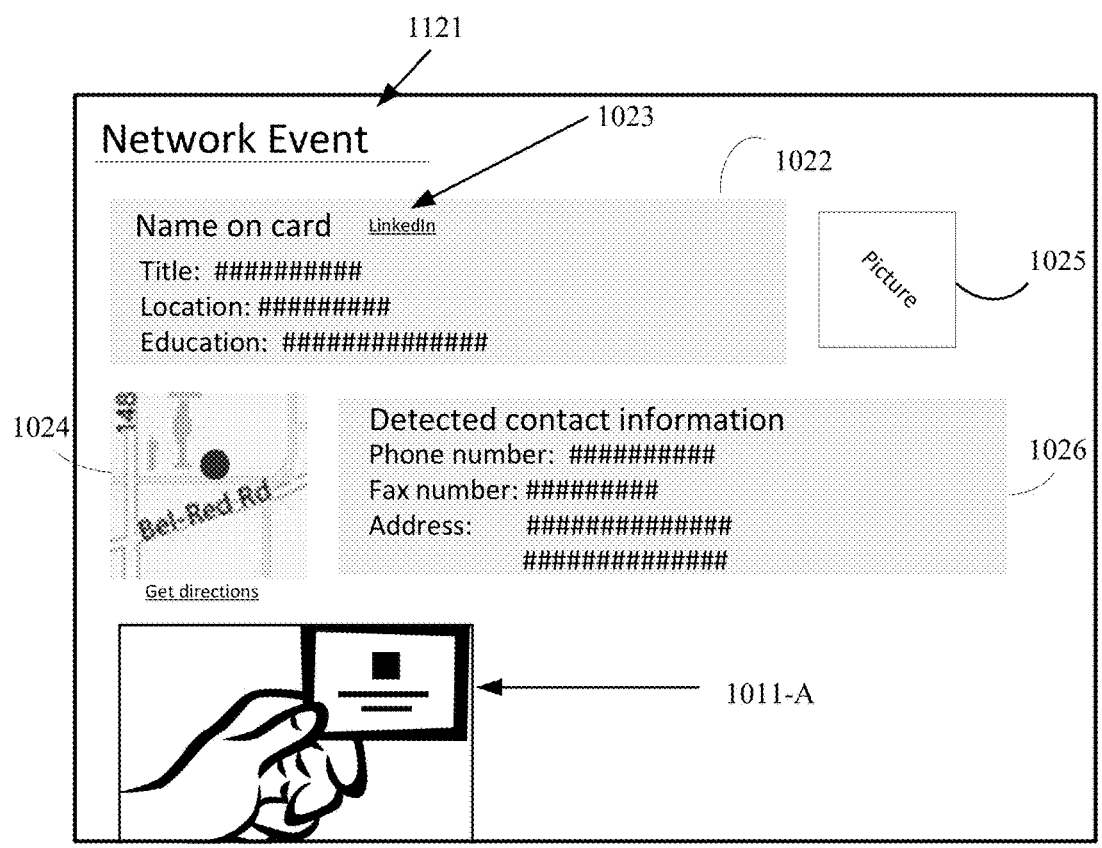

FIGS. 11A-11C illustrate another scenario for capturing and presenting an image item. In FIG. 11A, when browsing through their photographs 1011 on the phone 1010, the user may elect to share (1115) the business card image 1011-A through email 1013. As illustrated in FIG. 11B, the user may capture the business card image 1011-A into a note via sending a new message 1116 to a message address 1117 for their notebook. In some cases, the subject 1118 of the message 1116 may be used to indicate the note to which the content is to be associated with.

In some cases, the capture service can augment the content being captured into the note before the content is displayed to the user. For example, as shown in FIG. 11C, the subject 1118 of the message 1116 can be the title 1121 of the note, and the image can be presented according to the business card template.

Figure 12:
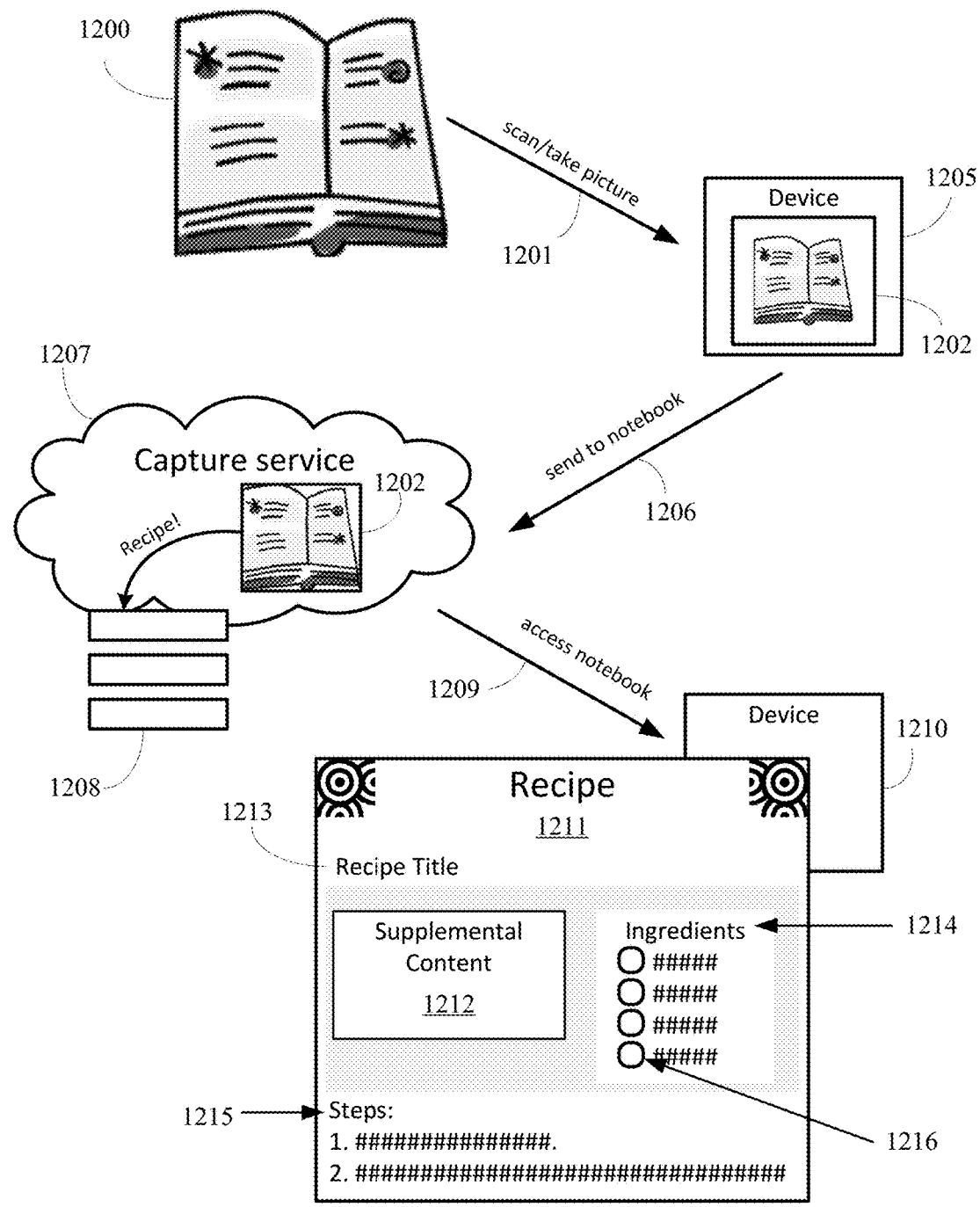
FIG. 12 illustrates yet another scenario for capturing and presenting an image item.

FIG. 12 illustrates yet another scenario for capturing and presenting an image item. In the scenario of FIG. 12, a user may want to capture a recipe from a cook book 1200. The user may scan or take a picture of the page (1201), resulting in an image of the recipe 1202, which may be stored on a device 1205. The user may send (1206) the image of the recipe 1202 to a notebook via any suitable method. Either before the user opens the note or once the image is in the notebook, the capture service 1207 can perform the augmentation on the image 1202. For example, the capture service 1207 may determine that the image is of a recipe and through extraction and knowledge base resolution and retrieval, generate an entity object with structured representations 1208 of the recipe. When the user accesses their notebook (1209), for example via device 1210, the recipe can be presented according to a recipe template 1211.

The entity object for the recipe can include information extracted from the image 1202 as well as supplemental content 1212, which may have been retrieved from a knowledge base. The attributes for recipe title 1213, ingredient array 1214, and steps array 1215 may be arranged in an aesthetic manner and even include enhanced functionality such as transforming the ingredient list into a to-do list with check boxes 1216.

Figure 13A:
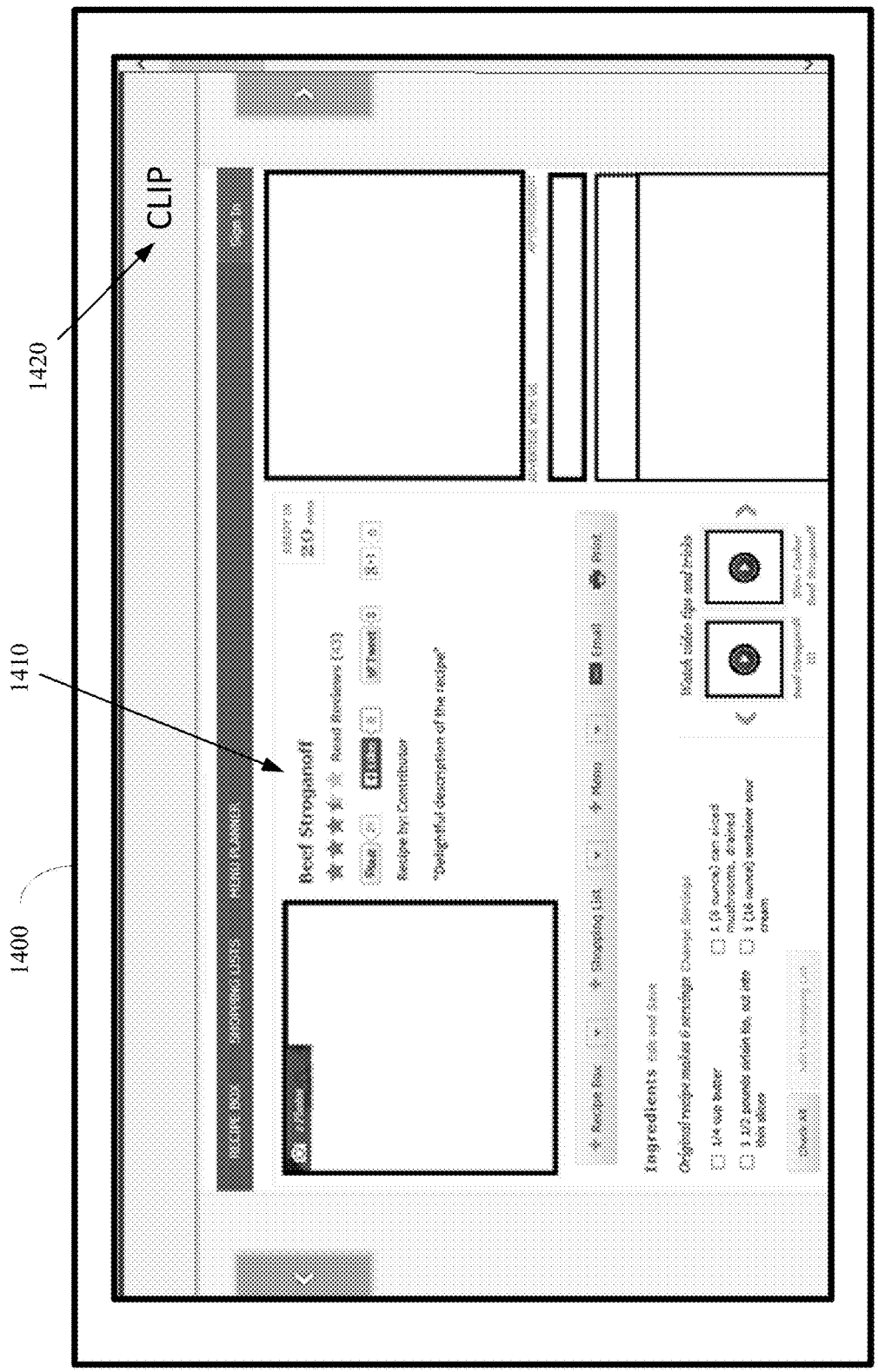
FIGS. 13A-13C illustrate scenarios of capturing content associated with a URL.
Figure 13B:
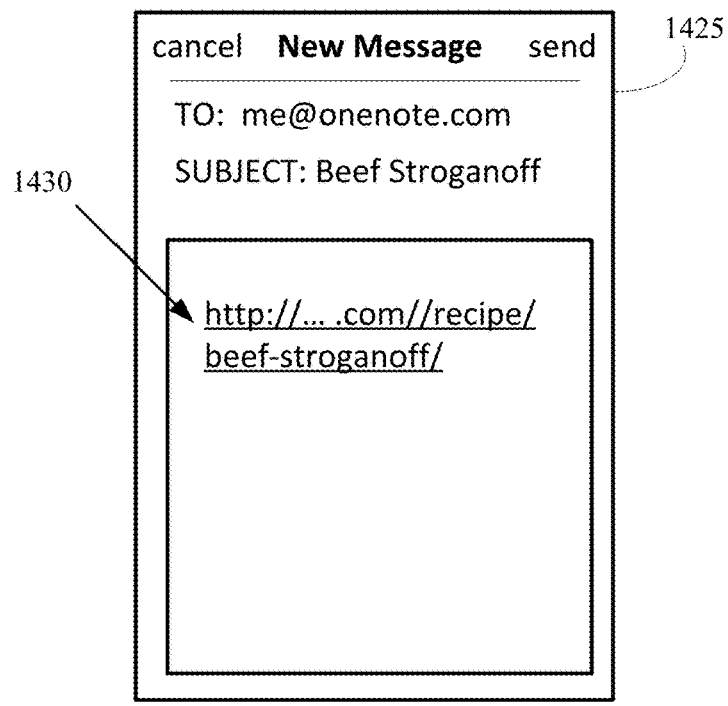
Figure 13C:
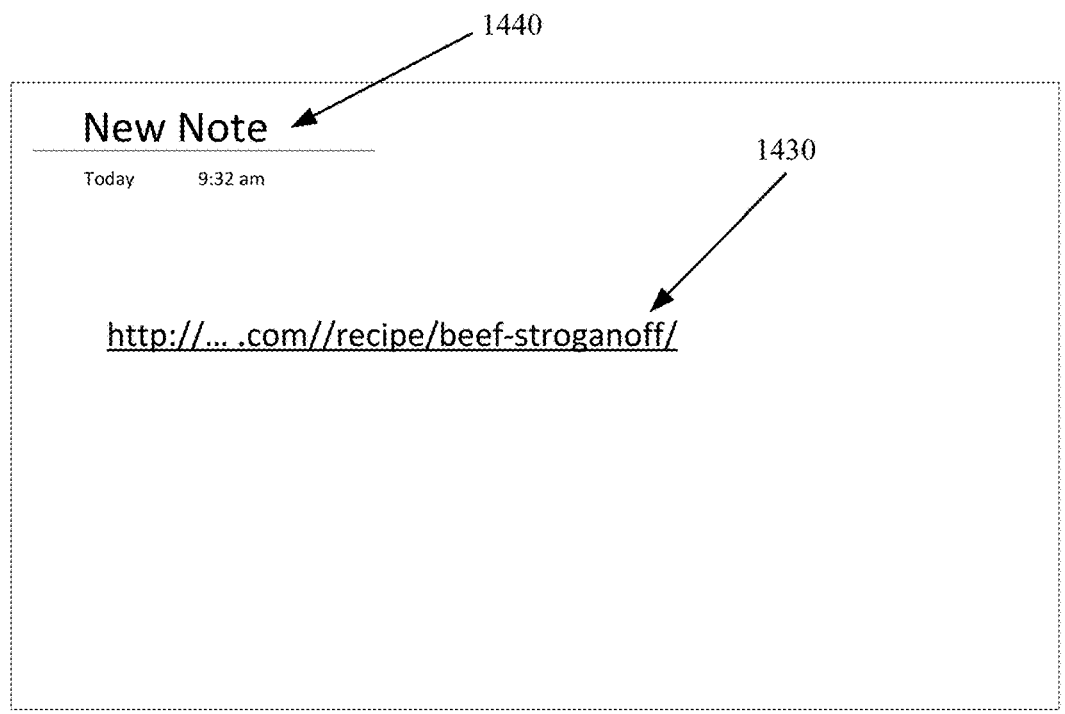
Figure 14:
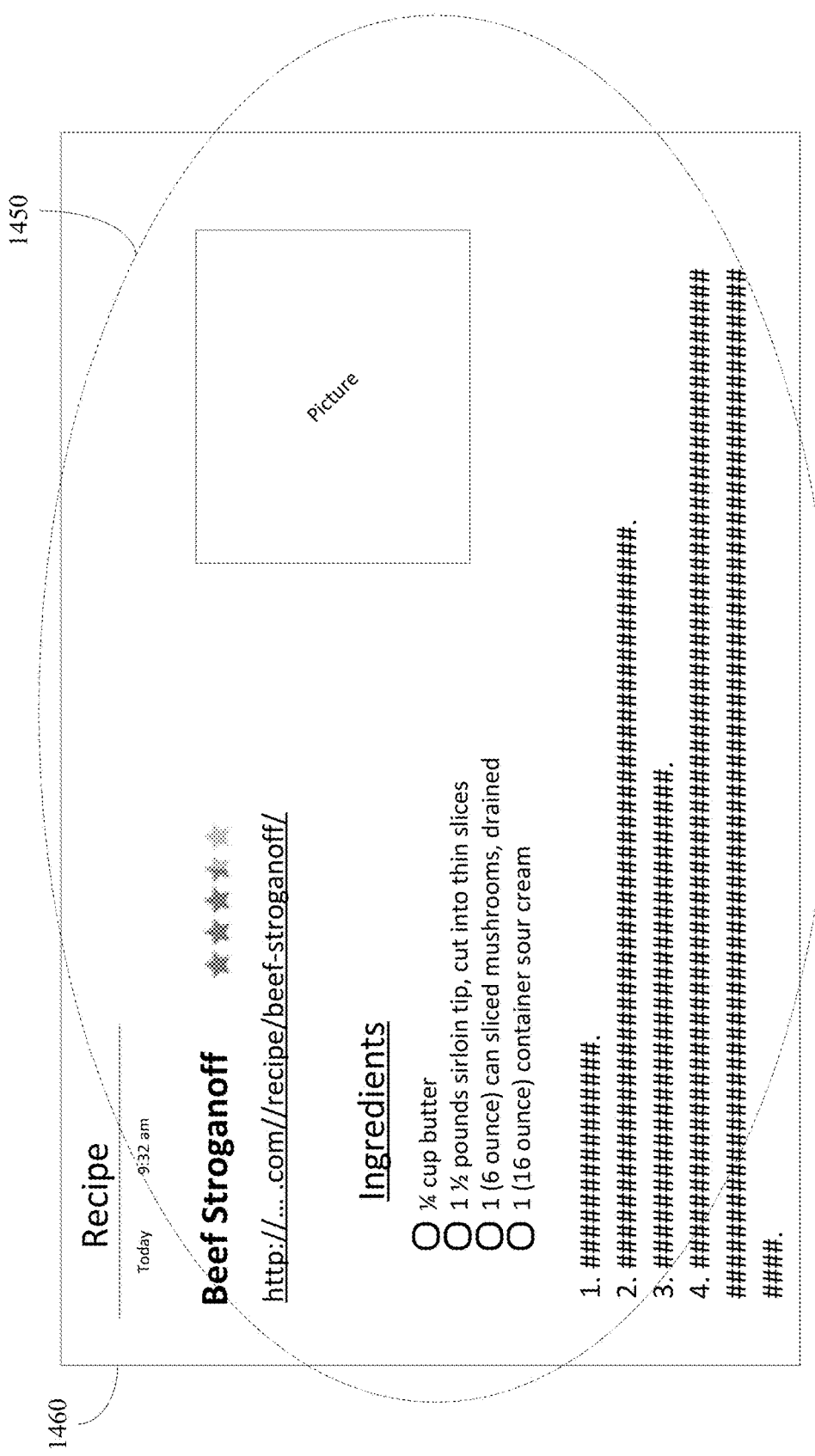
FIG. 14 illustrates an augmented presentation of a captured URL.

FIGS. 13A-13C illustrate scenarios of capturing content associated with a URL; and FIG. 14 illustrates an augmented presentation of a captured URL. Referring to FIG. 13A, a user may be browsing websites while on their tablet 1400 and see a recipe for "Beef Stroganoff" 1410 that they would like to capture into their notebook application for later use. In one scenario, as illustrated in FIG. 13A, they can select to clip 1420 the web page (or a part of the web page) to a note from a clipper. In another scenario, as illustrated in FIG.

13B, the user may send themselves a message 1425, such as described with respect to FIG. 11B, with a URL 1430 to the web page having the recipe. In yet another scenario, as illustrated in FIG. 13C, the user may paste or type the URL 1430 into their note 1440 directly. Then, as illustrated in FIG. 14, once the capture service determines that the primary entity is a recipe, a recipe template 1450 can be used to present the entity object created for the recipe in the user's note 1460.

Figure 15A:
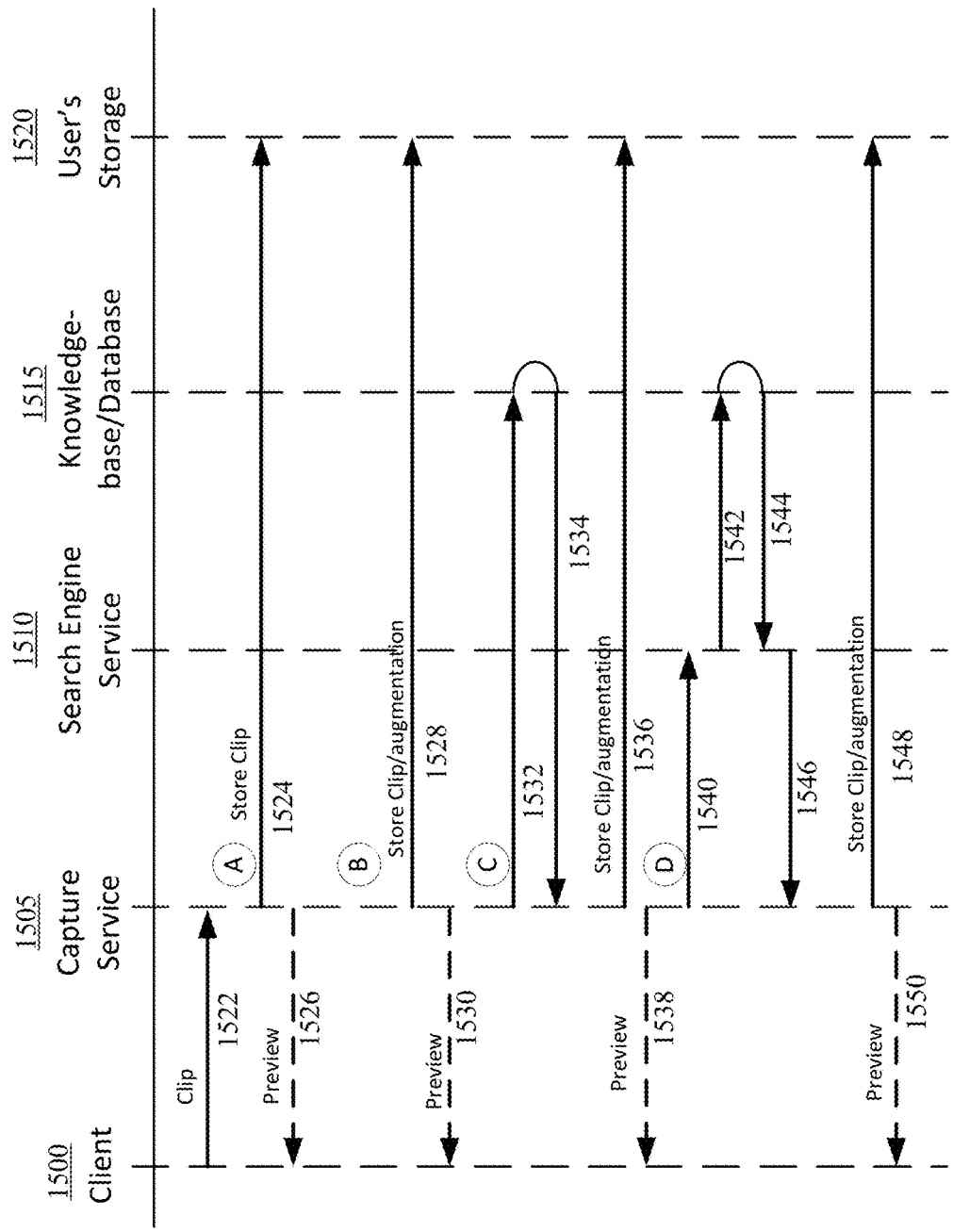
FIGS. 15A-15C illustrate system architecture diagrams with process flows for certain implementations.
Figure 15B:
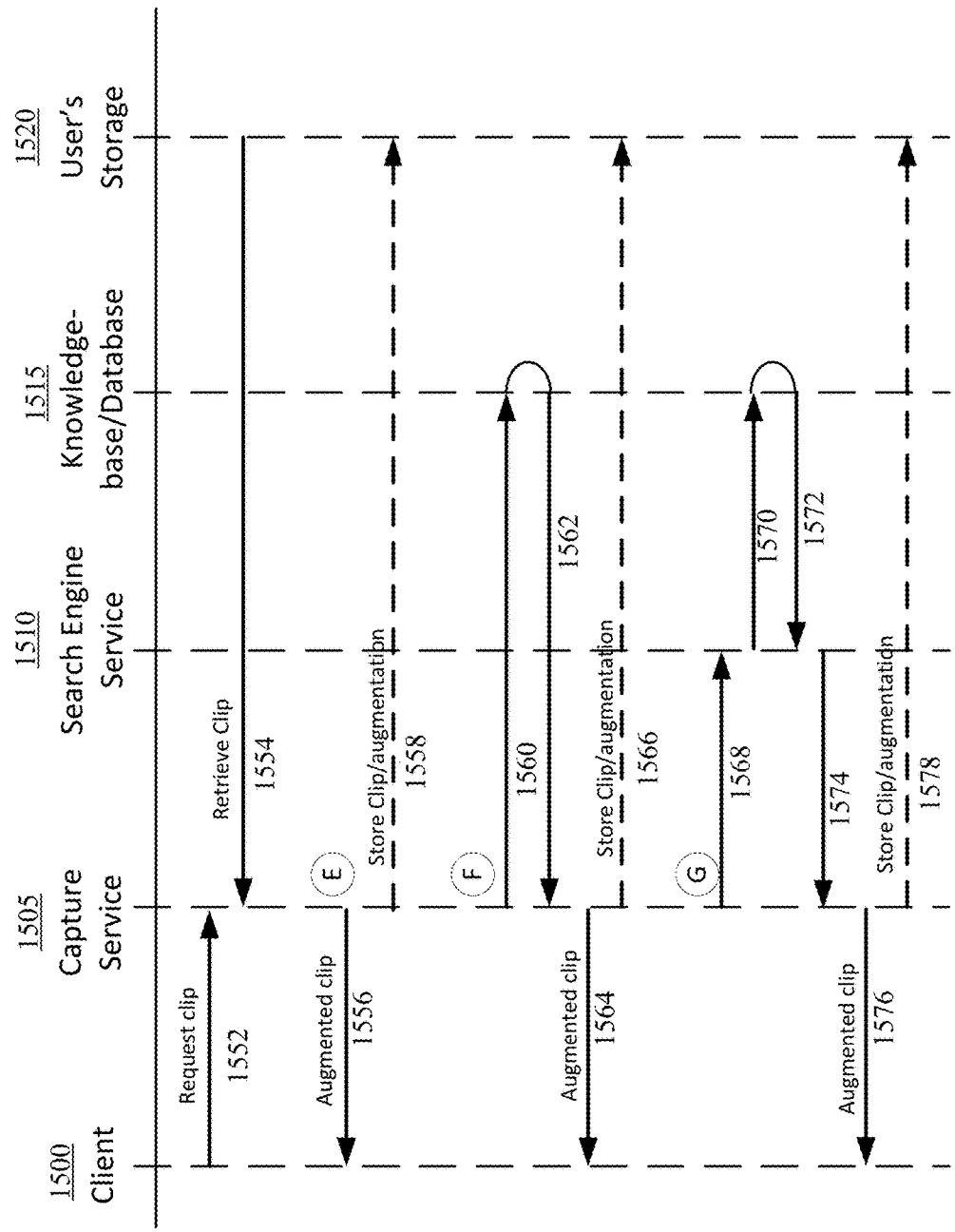
Figure 15C:
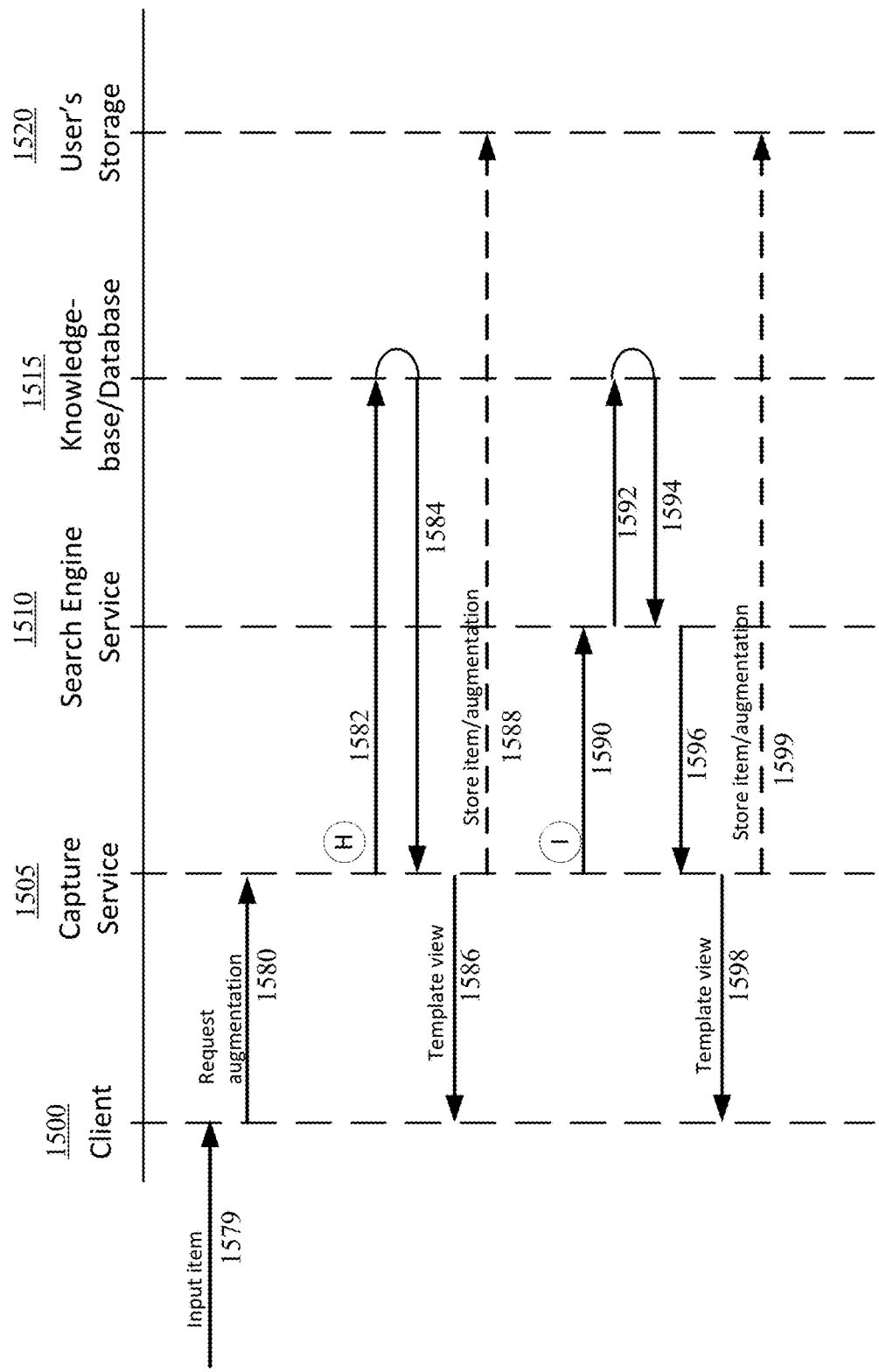

FIGS. 15A-15C illustrate system architecture diagrams with process flows for certain implementations. The operating environment can include client 1500, capture service 1505, search engine service (a web data service provided by a search provider) 1510, knowledgebase/databases 1515, and user's storage 1520.

Referring to FIG. 15A, a clip 1522 can be sent from a client 1500 to a capture service 1505. In some cases, the source of the page is sent in its entirety to the capture service. In other cases, a portion of the source is provided, and yet in other cases the URL is sent and the content retrieved at the server (by the capture service 1505). In a basic case, as illustrated in case A, the capture service can store the clip (1524) without augmentation in the user's storage 1520 and in some implementations a preview 1526 can be generated at the client 1500.

Cases B, C, and D illustrate various configurations for facilitating augmentation. In case B, augmentation can be carried out at the capture service 1505, for example, various processes involving removal of advertisements or formatting text for reading. Thus, after receiving the clip 1522, the clip and augmentation can be stored (1528) and optionally provided as a preview 1530.

In one implementation, the capture service 1505 may include a database of entities with associated cards (or contact another service that has a database of entities with associated cards) and can retrieve the topic card from this database. A look-up table may be used to get the corresponding card of a specified entity.

For example, in case C, entity recognition and augmentation can be carried out by the capture service 1505 through direct access of a knowledge base or database 1515. In response to a communication 1532 from the capture service 1505, data (1534) from the knowledgebase/database 1515 can be provided to the capture service and used to generate an augmented clip 1536, which can be stored in the user's storage 1520 and optionally provided for preview 1538.

According to an example implementation, the capture service 1505 can call a search engine service 1510, for example, the Google® or Bing® search engine service, with an entity to request the topic summary or topic card from the Google® or Bing® service.

For example, in case D, when the clip is content from a web page, the entity recognition may have already been performed by a search engine feature. In such cases, the URL of the web page may be sufficient to send to the capture service 1505, which requests (1540) the entity (or entities) on the page from the search engine service 1510. The search engine service 1510 may access (1542) knowledge base or database(s) 1515 (which may be the same or different ones than directly communicated with by the capture service) to retrieve a topic card (1544) for the web page. The search engine service 1510 may then provide the card 1546 (along with any other search results that may be requested by the capture service 1505) to the capture service 1505. The augmented clip 1548 can be stored at the user's storage 1520 and optionally provided as a preview 1550.

As described, in some cases, a preview may be presented. In other cases, the clipper collects the content and sends the content directly to storage (without a preview).

A preview of the clip can be provided by the capture service to the client and/or the clipper running on the client may render the preview. The preview can be rendered in a preview pane or window in the browser. The preview pane can be part of a clipping user interface in which editing, tagging, and other actions may be accomplished. For example, the user can add a tag or a comment to the clip via the user interface. In addition, the destination for the clip may also be configured from within the user interface. In some cases, a drop-down menu or input field can be used to indicate a specific destination. As an example, a user may select a notebook name or reading collection. A predicted destination may also be presented in the preview pane. For example, using entity recognition and auto-tagging, the clipper, or capture service, may determine that a user is looking for a house and recognizes elements of a webpage related to houses that then get saved to the user's housing notebook. Similarly, when recognizing the entity of a movie, such a clipping could automatically go into the user's movie notebook.

Referring to FIG. 15B, a clip 1522 can be sent from a client 1500 to a capture service 1505. As previously described, in some cases, the source of the page is sent in its entirety to the capture service. In other cases, a portion of the source is provided, and yet in other cases the URL is sent and the content retrieved at the server (by the capture service 1505). In the basic case (case A) illustrated in FIG. 15A, the capture service can store the clip (1524) without augmentation in the user's storage 1520.

Cases E, F, and G illustrate various configurations for facilitating augmentation after the clip (which may or may not have had augmentation performed) is stored. When a user retrieves the clip (such as clip 1522) from the user's storage (1554) for viewing and/or editing at the client 1500, the client 1500 may contact the capture service 1505 to retrieve a stored clip (via request 1552). As illustrated for case E, the capture service 1505 can automatically perform augmentation on the clip before providing the clip to the client 1500. For example, various processes involving removal of advertisements or formatting text for reading may be carried out. Once the augmentation is performed, the augmented clip 1556 can be provided to the client 1500 and stored (1558) at the user's storage 1520.

In one implementation, the capture service 1505 may include a database of entities with associated cards (or contact another service that has a database of entities with associated cards) and can retrieve the topic card from this database. A look-up table may be used to get the corresponding card of a specified entity.

For example, in case F, entity recognition and augmentation can be carried out by the capture service 1505 through direct access of a knowledge base or database 1515. In response to a communication 1560 from the capture service 1505, data (1562) from the knowledgebase/database 1515 can be provided to the capture service and used to generate an augmented clip 1564, which can be provided to the client 1500 and stored (1566) in the user's storage 1520.

In another implementation, such as illustrated in case G, the capture service 1505 can call a search engine service 1510, for example, the Google® or Bing® search engine service, with an entity to request the topic summary or topic card from the Google® or Bing® service. The capture service 1505 may use a URL associated with the clip to request (1568) the entity (or entities) on the page from the search engine service 1510. The search engine service 1510 may access (1570) knowledge base or database(s) 1515 (which may be the same or different ones than directly communicated with by the capture service) to retrieve a topic card (1572) for the web page. The search engine service 1510 may then provide the card 1574 (along with any other search results that may be requested by the capture service 1505) to the capture service 1505. The capture service can use the card 1574 (and any other data provided) to augment the clip and provide the augmented clip 1576 to the client 1500 and store (1578) the augmented clip at the user's storage 1520.

In addition to being input through a clipper, content can be captured into a user's storage 1520 through messaging (e.g., me@onenote.com) and while a user in their notebook application.

Referring to FIG. 15C, a user may input an item to a note (1579) at the client 1500. In some cases, the user may input an item via a messaging application (either at the client 1500 or a different client device than the one to which the user is accessing the notebook application). Augmentation may be requested (1580) by the client 1500 (e.g., a notebook application) automatically upon input of the item to a note or in response to a user command. In some cases, for items input via messaging (e.g., via me@onenote.com), the augmentation can be carried out as part of saving the item to the user's storage 1520 before the item is presented to the user in a note (as described with respect to the retrieved clip 1554 in FIG. 15B).

Cases H and I illustrate various configurations for facilitating augmentation of an item input to a notebook application. For example, in case H, entity recognition and augmentation (creation of the entity object) can be carried out by the capture service 1505 through access of a knowledge base or database 1515. In some cases, upon receipt of the item, the capture service 1505 can extract information from the item. For example, when the item is a URL, the capture service 1505 can retrieve the HTML DOM of the page at the URL and extract information from the DOM. As another example, when the item is an image, the capture service 1505 can perform image recognition and/or optical character recognition to extract information from the image (along with any metadata associated with the image). Using the item itself and/or the extracted information, the capture service 1505 accesses the knowledgebase/database 1515 to resolve the extracted information with data from the knowledgebase/database 1515 and/or retrieve additional information. In response to a communication 1582 from the capture service 1505, the information (1584) from the knowledgebase/database 1515 can be provided to the capture service and used to create an entity object for the item.

A template can be selected for the primary entity identified from the item and a template view is provided (1586) to the client 1500. The entity object (and item) can be stored (1588) in the user's storage 1520.

In another implementation, such as illustrated in case I, the capture service 1505 can call a data web service (provided by a search engine provider) 1510, for example, the Google® or Bing® search engine service, with the URL and/or information extracted from the item to request the topic summary or topic card(s) from the data web service (e.g., search engine service 1510) (1590). The search engine service 1510 may access (1592) knowledge base or database(s) 1515 (which may be the same or different ones than directly communicated with by the capture service) to retrieve at least one topic card (1594) for the web page. The search engine service 1510 may then provide the card (1596) (along with any other search results that may be requested by the capture service 1505) to the capture service 1505. The capture service can use the card(s) (and any other data provided) to generate the entity object and select a template for the primary entity identified from the item. The template view 1598 can then be provided to the client 1500. In addition, the entity object (and item) can be stored (1599) in the user's storage 1520.

Figure 16:
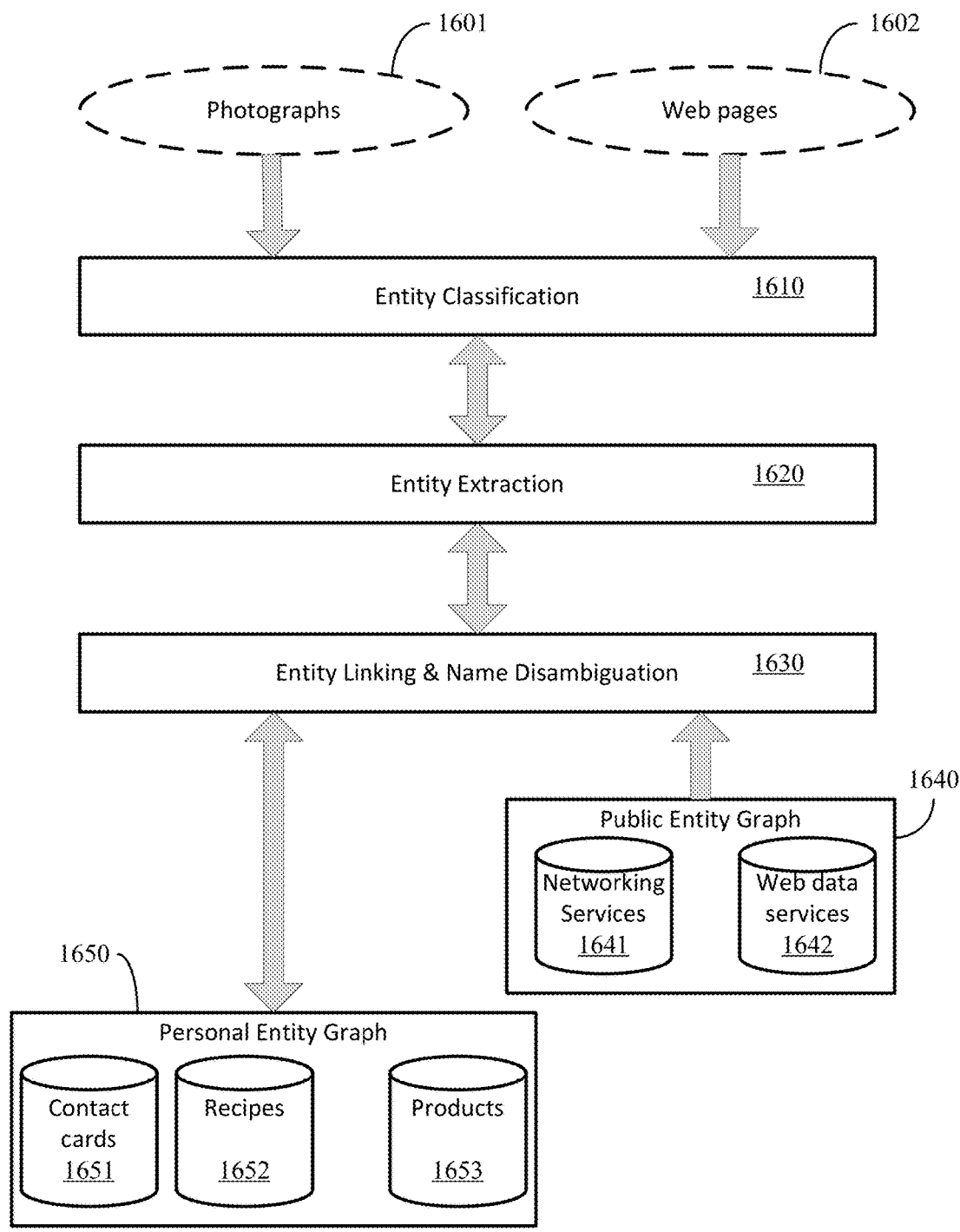
FIG. 16 illustrates a system architecture of an entity mining engine that may be implemented for a capture service.

FIG. 16 illustrates a system architecture of an entity mining engine that may be implemented for a capture service. Referring to FIG. 16, for a photograph 1601 or web page 1602 (e.g., input via a clipper or other entry to the capture service), an entity-type classification (1610) can be performed. The entity-type classification (1610) can be performed using a vision-based approach where a learned image representation and a recognized text representation are jointly used to make a classification decision. The image representation can be learned using a deep neural network (DNN) technology (see e.g., Li Deng and Dong Yu "Deep Learning: Methods and Applications," Now Publisher, 2014). The text representation may be recognized using an OCR engine. One DNN that may be used is a Markov DNN, having a supervised probabilistic model with a tree structure and maximum clique of a triangle.

Vision-based entity extraction can use vision features such as position, alignment, font size, line space and the like, and text features such as words, capitalization, percentage of digits and the like. The vision and text features can be matched to knowledge base features for further identification.

Photographs can be passed to a corresponding vision-based entity extractor (1620), which uses, through entity linking and name disambiguation (1630) from sources such as a public entity graph 1640, the visual layout information, text features, and entity knowledge (from an associated memory store, e.g., the user's storage 1520) to segment text content, assign semantic labels, and link the note (to which the photograph and/or webpage was input) to entities available in a user's personal entity graph (1650). The public entity graph 1640 can include resources from a social networking service 1641 (such as available through LinkedIn®), web data services 1642 (such as available through Bing® and Google®), and other public knowledge bases. The entities available in the user's personal entity graph 1650 can include, but are not limited to, one or more of contact/business cards 1651, recipes 1652, and products 1653.

As illustrated by the architecture of FIG. 16, content captured to a note, for example photographs and web pages, can be automatically classified and labeled with their entity types. Based on the entity type classification, the primary entity can be determined. For example, the entities available in the user's personal entity graph 1650 can provide the available primary entities with which content be may classified. The techniques described herein can maintain privacy of the content being input to the note.

In an example scenario, a photograph classified as a business card can have a person's name, title, organization/affiliation, phone number(s), email address(es), website and other information extracted from the image. Text features like words, capitalization and patterns, and visual features like text position, font size, font style and alignment, can be used to extract entities. A knowledge base (e.g., from public entity graph 1640) can be used to link to existing entities and properties. For example, the person identified on the business card may be linked with an entity in a memory store (e.g., the user's storage 1520) so that information from the person's LinkedIn page or other information can be associated together.

Figure 17:
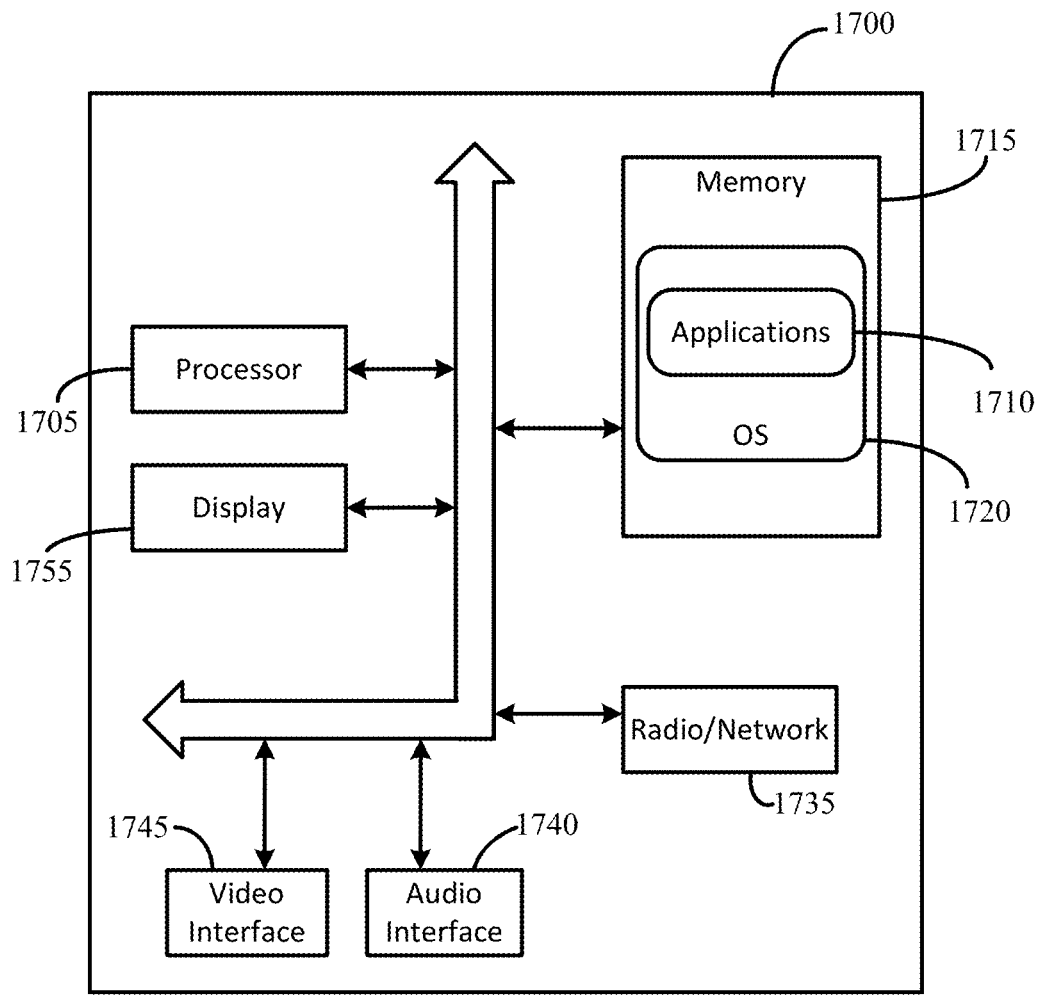
FIG. 17 is a block diagram illustrating components of a computing device used in some embodiments.
Figure 18:
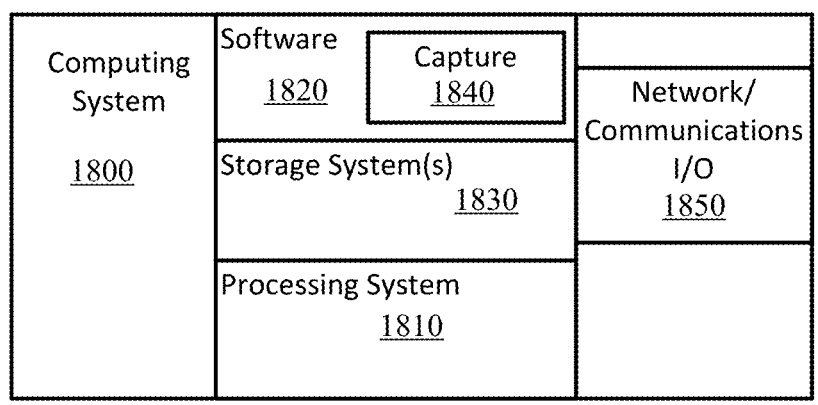
FIG. 18 illustrates components of a computing system that may be used to implement the methods and services described herein.

FIG. 17 shows a block diagram illustrating components of a computing device used in some embodiments; and FIG. 18 illustrates components of a computing system that may be used to implement the methods and services described herein. For example, system 1700 can be used in implementing a computing device embodying the client(s) 100, 900, 1010, 1205, 1212, 1500, and the like. It should be understood that aspects of the system described herein are applicable to both mobile and traditional desktop computers, as well as server computers and other computer systems. Accordingly, while FIG. 18 illustrates components of a computing system that may embody a capture service as described herein, certain aspects described with respect to system 1700 are applicable to server(s) on which the capture services (e.g., capture services 115, 1505) are carried out.

Referring to FIG. 17, system 1700 includes a processor 1705 that processes data according to instructions of one or more application programs 1710, and/or operating system (OS) 1720. The processor 1705 may be, or is included in, a system-on-chip (SoC) along with one or more other components such as network connectivity components, sensors, video display components.

The one or more application programs 1710 may be loaded into memory 1715 and run on or in association with the operating system 1720. Examples of application programs include phone dialer programs, e-mail programs, information management programs, word processing programs, Internet browser programs, messaging programs, game programs, notebook applications and the like. Other applications may be loaded into memory 1715 and run on the device, including various client and server applications.

Examples of operating systems include Symbian® OS, Windows® phone OS, Windows®, Blackberry® OS, Apple® iOS®, and Android® OS. Other operating systems are contemplated.

System 1700 may also include a radio/network interface 1735 that performs the function of transmitting and receiving radio frequency communications. The radio/network interface 1735 facilitates wireless connectivity between system 1700 and the "outside world," via a communications carrier or service provider. Transmissions to and from the radio/network interface 1735 are conducted under control of the operating system 1720, which disseminates communications received by the radio/network interface 1735 to application programs 1710 and vice versa.

The radio/network interface 1735 allows system 1700 to communicate with other computing devices, including server computing devices and other client devices, over a network.

In various implementations, data/information stored via the system 1700 may include data caches stored locally on the device or the data may be stored on any number of storage media that may be accessed by the device via the radio/network interface 1735 or via a wired connection between the device and a separate computing device associated with the device, for example, a server computer in a distributed computing network, such as the Internet. As should be appreciated such data/information may be accessed through the device via the radio interface 1735 or a distributed computing network. Similarly, such data/information may be readily transferred between computing devices for storage and use according to well-known data/information transfer and storage means, including electronic mail and collaborative data/information sharing systems.

An audio interface 1740 can be used to provide audible signals to and receive audible signals from the user. For example, the audio interface 1740 can be coupled to a speaker to provide audible output and to a microphone to receive audible input, such as to facilitate a telephone conversation. System 1700 may further include video interface 1745 that enables an operation of an optional camera (not shown) to record still images, video stream, and the like. The video interface may also be used to capture certain images for input to a natural user interface (NUI).

Visual output can be provided via a display 1755. The display 1755 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form.

The display 1755 may be a touchscreen display. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

In other embodiments, a touch pad may be incorporated on a surface of the computing device that does not include the display. For example, the computing device may have a touchscreen incorporated on top of the display and a touch pad on a surface opposite the display.

Referring to FIG. 18, system 1800 may be implemented within a single computing device or distributed across multiple computing devices or sub-systems that cooperate in executing program instructions. The system 1800 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 1800 can include a processing system 1810, which may include one or more processors and/or other circuitry that retrieves and executes software 1820 from storage system 1830. Processing system 1810 may be implemented within a single processing device but may also be distributed across multiple processing devices or sub-systems that cooperate in executing program instructions.

Storage system(s) 1830 can include any computer readable storage media readable by processing system 1810 and capable of storing software 1820. Storage system 1830 may be implemented as a single storage device but may also be implemented across multiple storage devices or sub-systems co-located or distributed relative to each other. Storage system 1830 may include additional elements, such as a controller, capable of communicating with processing system 1810. Storage system 1830 may also include storage devices and/or sub-systems on which data such as entity-related information is stored.

Software 1820 may be implemented in program instructions and among other functions may, when executed by system 1800 in general or processing system 1810 in particular, direct the system 1800 or processing system 1810 to operate as described herein for providing a capture service and/or augmenting and presenting captured data (as Capture software 1840.

System 1800 may represent any computing system on which software 1820 may be staged and from where software 1820 may be distributed, transported, downloaded, or otherwise provided to yet another computing system for deployment and execution, or yet additional distribution.

In embodiments where the system 1800 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 1850 may be included, providing communication connections and devices that allow for communication between system 1800 and other computing systems (not shown) over a communication network or collection of networks (not shown) or the air.

Certain techniques set forth herein may be described in the general context of computer-executable instructions, such as program modules, executed by one or more computing devices. Generally, program modules include routines, programs, objects, components, and data structures that perform particular tasks or implement particular abstract data types.

Embodiments may be implemented as a computer process, a computing system, or as an article of manufacture, such as a computer program product or computer-readable medium. Certain methods and processes described herein can be embodied as software, code and/or data, which may be stored on one or more computer-readable media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process.

Computer-readable media can be any available computer-readable storage media or communication media that can be accessed by the computer system.

Communication media include the media by which a communication signal containing, for example, computer-readable instructions, data structures, program modules, or other data, is transmitted from one system to another system. The communication media can include guided transmission media, such as cables and wires (e.g., fiber optic, coaxial, and the like), and wireless (unguided transmission) media, such as acoustic, electromagnetic, RF, microwave and infrared, that can propagate energy waves. Although described with respect to communication media, carrier waves and other propagating signals that may contain data usable by a computer system are not considered "computer-readable storage media."

By way of example, and not limitation, computer-readable storage media may include volatile and non-volatile, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. In no case do "computer-readable storage media" consist of carrier waves or propagating signals.

In addition, the methods and processes described herein can be implemented in hardware modules. For example, the hardware modules can include, but are not limited to, application-specific integrated circuit (ASIC) chips, field programmable gate arrays (FPGAs), and other programmable logic devices now known or later developed. When the hardware modules are activated, the hardware modules perform the methods and processes included within the hardware modules.

Certain aspects of the invention provide the following non-limiting embodiments:

Example 1

A method of augmenting and presenting captured data, comprising: receiving one or more structured representations for content associated with an item input to a notebook application; identifying a primary entity of the item; creating an entity object for the primary entity of the item from at least the one or more structured representations.

Example 2

The method of example 1, further comprising: determining a template for presenting the entity object according to the primary entity, the template being selected from a set of templates corresponding to different primary entities.

Example 3

The method of example 1 or 2, wherein the item comprises a uniform resource locator (URL), the method further comprising: requesting the one or more structured representations for the content associated with the URL from a web data service; and receiving, from the web data service, one or more models associated with content of a document referenced by the URL, the one or more models providing the one or more structured representations of the item.

Example 4

The method of example 3, wherein creating the entity object comprises selecting a single model of the one or more models associated with the content of the document according to a selection criteria.

Example 5

The method of example 3, wherein creating the entity object comprises merging attributes of at least two models of the one or more models associated with the content of the document.

Example 6

The method of any of examples 1-5, wherein the primary entity of the object is identified from a minimum number of attributes of the one or more structured representations for the content associated with the item.

Example 7

The method of example 6, wherein the primary entity is a recipe; and the minimum number of attributes comprise at least an ingredient array and a steps array.

Example 8

The method of any of examples 1, 2, 6 or 7, wherein the item comprises an image, the method further comprising: extracting and classifying information from the image and metadata associated with the image; and generating at least one of the one or more structured representations by using the extracted and classified information from the image and metadata associated with the image, wherein identifying the primary entity of the item comprises using the extracted and classified information from the image and metadata associated with the image.

Example 9

The method of example 8, further comprising: requesting detailed information corresponding to at least one attribute associated with the primary entity from a knowledgebase or a web data service.

Example 10

The method of example 8 or 9, wherein the image contains an image of a business card.

Example 11

The method of any of examples 1, 2, 6 or 7, wherein the item comprises a clip, the method further comprising: requesting the one or more structured representations for the content associated with the clip from a web data service.

Example 12

A system comprising: one or more computer readable storage media; and program instructions stored on the one or more computer readable storage media for presenting content captured for a notebook application that, when executed by a processing system, direct the processing system to: request an entity object for content associated with an item input to a notebook application service; and in a user interface to the notebook application service, surface an entity-specific presentation of the entity object for the content associated with the item input to the notebook application service, wherein the entity object comprises attributes from one or more structured representations for the content associated with the item.

Example 13

The system of example 12, wherein the item comprises one or more of a URL, an image, and a clip.

Example 14

One or more computer readable storage media having program instructions stored thereon for augmenting and presenting captured data, when executed by a processing system, direct the processing system to: identify a primary entity of an item input to a notebook application; create an entity object for the primary entity of the item at least from one or more structured representations for content associated with the item; and determine a template for presenting the entity object according to the primary entity, the template being selected from a set of templates corresponding to different primary entities.

Example 15

The media of example 14, wherein the item comprises a URL, wherein the program instructions further direct the processing system to: request the one or more structured representations for the content associated with the URL from a web data service; and receive, from the web data service, one or more models associated with content of a document referenced by the URL, the one or more models providing the one or more structured representations of the item.

Example 16

The media of example 15, wherein the entity object comprises a single model of the one or more models associated with the content of the document selected according to a selection criteria.

Example 17

The media of example 15, wherein the entity object comprises merged attributes of at least two models of the one or more models associated with the content of the document.

Example 18

The media of any of examples 14-17, wherein the item comprises an image, wherein the program instructions further direct the processing system to: extract and classify information from the image and metadata associated with the image; and generate at least one of the one or more structured representations by using the extracted and classified information from the image and metadata associated with the image, wherein the primary entity of the item is identified by using the extracted and classified information from the image and metadata associated with the image.

Example 19

A system having a user interface with a display surfacing entity related information in response to receiving an entity determination of content to be captured by a notebook application.

Example 20

The system of example 19, where the entity determination is based on content being rendered in a view region of the user interface.

Example 21

The system of example 19, where the entity determination is based on content not displayed in the view region of the user interface. For example, when the content being captured includes a URL, the entity determination may be based on content of a document referenced by the URL.

Example 22

The system of any of examples 19-21, where the entity related information includes a presentation of content including at least one element not found in the view region.

Example 23

A method of enhancing captured content including identifying an entity associated with a first content; and transforming the first content into second content based on the entity associated with the first content.

Example 24

The method of example 23, where the transformation includes one or more of removing advertisements, making certain text live/selectable, filtering, tagging and rearranging the presentation of content.

Example scenarios have been presented to provide a greater understanding of certain embodiments of the present invention and of its many advantages. The example scenarios described herein are simply meant to be illustrative of some of the applications and variants for embodiments of the invention. They are, of course, not to be considered in any way limitative of the invention.

It should be understood that the examples and embodiments described herein are for illustrative purposes only and that various modifications or changes in light thereof will be suggested to persons skilled in the art and are to be included within the spirit and purview of this application.

What is claimed is:

1. A method of augmenting and presenting captured data, comprising:
  receiving one or more structured representations for content associated with an item input to a notebook application;
  identifying a primary entity of the item, wherein the primary entity defines the content associated with the item;
  creating an entity object for the primary entity of the item from at least the one or more structured representations, wherein the entity object comprises additional information relevant to the item input to the notebook application, the additional information being retrieved from one or more sources other than that of the item;
  determining a template for presenting the entity object according to the primary entity, the template being selected from a set of templates, wherein each template from the set of templates corresponds to different primary entities so that an arrangement and presentation for one primary entity is different than that of another primary entity;
  providing the entity object in a user interface to the notebook application according to the selected template.

2. The method of claim 1, wherein the item comprises a uniform resource locator (URL), the method further comprising:
  requesting the one or more structured representations for the content associated with the URL from a web data service; and
  receiving, from the web data service, one or more models associated with content of a document referenced by the URL, the one or more models providing the one or more structured representations of the item.

3. The method of claim 2, wherein creating the entity object comprises selecting a single model of the one or more models associated with the content of the document according to a selection criteria.

4. The method of claim 2, wherein creating the entity object comprises merging attributes of at least two models of the one or more models associated with the content of the document.

5. The method of claim 1, wherein the primary entity of the object is identified from a minimum number of attributes of the one or more structured representations for the content associated with the item.

6. The method of claim 5, wherein the primary entity is a recipe; and the minimum number of attributes comprise at least an ingredient array and a steps array.

7. The method of claim 1, wherein the item comprises an image, the method further comprising:
  extracting and classifying information from the image and metadata associated with the image; and
  generating at least one of the one or more structured representations by using the extracted and classified information from the image and metadata associated with the image,
  wherein identifying the primary entity of the item comprises using the extracted and classified information from the image and metadata associated with the image.

8. The method of claim 7, further comprising: requesting detailed information corresponding to at least one attribute associated with the primary entity from a knowledgebase or a web data service.

9. The method of claim 7, wherein the image contains an image of a business card.

10. The method of claim 1, wherein the item comprises a clip, the method further comprising:
  requesting the one or more structured representations for the content associated with the clip from a web data service.

11. A system comprising:
  one or more computer readable storage media;
  and program instructions stored on the one or more computer readable storage media for presenting content captured for a notebook application that, when executed by a processing system, direct the processing system to:
  request an entity object for a primary entity of content associated with an item input to a notebook application service, wherein the primary entity defines the content associated with the item;
  determining a template for presenting the entity object according to the primary entity, the template being selected from a set of templates, wherein each template from the set of templates corresponds to different primary entities so that an arrangement and presentation for one primary entity is different than that of another primary entity, and
  in a user interface to the notebook application service, surface an entity-specific presentation of the entity object for the content associated with the item input to the notebook application service, wherein an arrangement for the entity-specific presentation of the entity object is controlled by the selected template for the primary entity, wherein the entity object comprises attributes from one or more structured representations for the content associated with the item and additional information relevant to the item, the additional information being retrieved from one or more sources other than that of the item.

12. The system of claim 11, wherein the item comprises a URL.

13. The system of claim 11, wherein the item comprises an image.

14. The system of claim 11, wherein the item comprises a clip.

15. One or more computer readable storage media having program instructions stored thereon for augmenting and presenting captured data, when executed by a processing system, direct the processing system to:
   identify a primary entity of an item input to a notebook application, wherein the primary entity defines content associated with the item;
   create an entity object for the primary entity of the item at least from one or more structured representations for content associated with the item, wherein the entity object comprises additional information relevant to the item, the additional information being obtained from sources accessible over the Internet or one or more knowledge bases; and
   determine a template for presenting the entity object according to the primary entity, the template being selected from a set of templates, wherein each template from the set of templates corresponds to different primary entities so that an arrangement and presentation for one primary entity is different than that of another primary entity;
   provide the entity object in a user interface to the notebook application according to the selected template.

16. The media of claim 15, wherein the item comprises a URL, wherein the program instructions further direct the processing system to:
   request the one or more structured representations for the content associated with the URL from a web data service; and
   receive, from the web data service, one or more models associated with content of a document referenced by the URL, the one or more models providing the one or more structured representations of the item.

17. The media of claim 16, wherein the entity object comprises a single model of the one or more models associated with the content of the document selected according to a selection criteria.

18. The media of claim 16, wherein the entity object comprises merged attributes of at least two models of the one or more models associated with the content of the document.

19. The media of claim 15, wherein the item comprises an image, wherein the program instructions further direct the processing system to:
   extract and classify information from the image and metadata associated with the image; and
   generate at least one of the one or more structured representations by using the extracted and classified information from the image and metadata associated with the image,
   wherein the primary entity of the item is identified by using the extracted and classified information from the image and metadata associated with the image.

* * * * *